(12) United States Patent
Swarna et al.

(10) Patent No.: US 7,487,121 B2
(45) Date of Patent: Feb. 3, 2009

(54) FLEXIBLE EVENT CORRELATION AGGREGATION TOOL

(75) Inventors: Chandramouli Swarna, Cincinnati, OH (US); Renjith Ramachandran, Cincinnati, OH (US); Niraj Desai, Union, KY (US); Asha Sebastian, Cincinnati, OH (US); Thendral Venugopalan, Tamil Nadu (IN); Ravikiran Samayamantry, Andhra Pradesh (IN)

(73) Assignee: Convergys CMG Utah, South Jordan, UT (US)

( * ) Notice: Subject to any disclaimer, the term of this patent is extended or adjusted under 35 U.S.C. 154(b) by 594 days.

(21) Appl. No.: 10/190,844

(22) Filed: Jul. 8, 2002

(65) Prior Publication Data

US 2004/0015497 A1 Jan. 22, 2004

(51) Int. Cl.
*G06Q 40/00* (2006.01)
(52) U.S. Cl. .......................................... 705/30
(58) Field of Classification Search ............. 705/1; 709/223, 224, 245
See application file for complete search history.

(56) References Cited

U.S. PATENT DOCUMENTS

| | | | |
|---|---|---|---|
| 5,392,390 A | | 2/1995 | Crozier |
| 6,032,132 A | * | 2/2000 | Nelson ......................... 705/34 |
| 6,088,659 A | | 7/2000 | Kelley et al. |
| 6,119,011 A | * | 9/2000 | Borst et al. .............. 455/452.2 |
| 6,199,068 B1 | | 3/2001 | Carpenter |
| 6,405,251 B1 | | 6/2002 | Bullard et al. |
| 6,625,657 B1 | | 9/2003 | Bullard |
| 6,751,663 B1 | * | 6/2004 | Farrell et al. ................. 709/224 |
| 6,813,645 B1 | * | 11/2004 | Meyer ........................ 709/245 |
| 6,850,974 B2 | * | 2/2005 | Schweitzer et al. ......... 709/223 |
| 2001/0039537 A1 | | 11/2001 | Carpenter et al. |
| 2002/0165958 A1 | | 11/2002 | Duffield et al. |
| 2002/0188710 A1 | | 12/2002 | Duffield et al. |

FOREIGN PATENT DOCUMENTS

| | | |
|---|---|---|
| WO | PCT US98/19034 | 9/1998 |
| WO | WO 99/13426 | 3/1999 |

OTHER PUBLICATIONS

Office Action dated Oct. 3, 2005 for U.S. Appl. No. 10/190,728, filed Jul. 8, 2002.
U.S. Appl. No. 10/190,728, filed Jul. 8, 2002; Swarna.

(Continued)

*Primary Examiner*—James P. Trammell
*Assistant Examiner*—Sanjeev Malhotra
(74) *Attorney, Agent, or Firm*—Ria Farrell Schalnat; Barry Visconte; Frost Brown Todd LLC

(57) ABSTRACT

A mediation system for a converged network system for an xSP (i.e., any service provider of Information Technology (IT)/business services) is readily interactively configured by a user (e.g., an xSP) to correlate and aggregate usage data from a number of collection points for billing-related purposes. Usage data that includes a source record and one or more related records are matched, assembled upon satisfying assembly criteria (e.g., time-base, expression-based, volume-based), and returned in accordance with an assembly specification (e.g., one to one, one to many, many to many).

11 Claims, 22 Drawing Sheets

OTHER PUBLICATIONS

Information Disclosure Statement dated Jul. 8, 2002 for U.S. Appl. No. 11/190,728.
Office Action dated Oct. 3, 2005 for U.S. Appl. No. 11/190,728.
Information Disclosure Statement dated Mar. 27, 2006 for U.S. Appl. No. 11/190,728.
Office Action dated May 2, 2006 for U.S. Appl. No. 11/190,728.
Office Action dated Jan. 26, 2007 for U.S. Appl. No. 11/190,728.
Office Action dated Sep. 7, 2007 for U.S. Appl. No. 11/190,728.
Information Disclosure Statement dated Dec. 26, 2007 for U.S. Appl. No. 11/190,728.
U.S. Appl. No. 10/666,631, filed Sep. 18, 2003; Birch.
Information Disclosure Statement dated Sep. 18, 2003 for U.S. Appl. No. 11/666,631.
Office Action dated Jul. 26, 2007 for U.S. Appl. No. 11/666,631.
Information Disclosure Statement dated Dec. 20, 2007 for U.S. Appl. No. 11/666,631.
Office Action dated Dec. 31, 2007 for U.S. Appl. No. 11/666,631.
U.S. Appl. No. 10/724,955, filed Dec. 1, 2003; Ramachandran.
Information Disclosure Statement dated Oct. 14, 2004 for U.S. Appl. No. 11/724,955.
Information Disclosure Statement dated Dec. 20, 2007 for U.S. Appl. No. 11/724,955.
Office Action dated Dec. 31, 2007 for U.S. Appl. No. 10/666,631.
Office Action dated Mar. 17, 2008 for U.S. Appl. No. 10/190,728.
Office Action dated Jul. 21, 2008 for U.S. Appl. No. 10/724,955.

* cited by examiner

| NETWORK | EVENT CORRELATION / AGGREGATION CONFIGURATION |
|---|---|
| SEARCH | |
| COLLECTION NE | SELECT THE MDU TYPE FOR SEARCH: |
| DISTRIBUTION NE | FLEXDEMO_COLLEC ▸   SEARCH |
| FLEX NE | |
| MAPPING SCRIPT DEFINITION | MAPPING SCRIPT: |
| ASSOCIATE MAPPING SCRIPT | FLEXDEMO_COLLEC ▸   ADD |
| CORRELATION/AGGREGATION | |
| ASSOCIATE CORRELATION/AGGREGATION | ACTIONS           MDU TYPES        NAME |
| RESOURCES | EXAMPLE_ACTION 1    MDU_TYPE_1    NAME_1 |
| ASSOCIATIONS | EXAMPLE_ACTION 2    MDU_TYPE_2    NAME_2 |
| GENERIC DB | |
| TABLES | |
| ADMIN | |
| CONFIGURATION | |
| GT TABLES | |
| ONE 2 ONE | |
| SUBSYSTEMS | |
| SUPPORT | |
| LOGOUT | |

UPDATE EVENT CORRELATION/AGGREGATION CONFIGURATION

[ATTRIBUTES] [SOURCE RECORD] [RELATED RECORD]
[MATCHING CRITERIA] [ASSEMBLY CRITERIA] [ASSEMBLY SPEC]

NAME: *(REQUIRED)
EXPRBASED
(20 CHARACTERS MAXIMUM)

CREATED / MODIFIED DATE: 2/18/## 4:38:47 PM GMT-0500   USER: ROOT

NOTES:

TOPOLOGY:
◉ ONE TO ONE
○ ONE TO MANY
○ MANY TO MANY

PURGE OPTION:
◉ ON ASSEMBLY
○ ON THRESHOLD OF [   ]
(NUMBER OF DAYS)

[FINISH] [CLOSE ⊠]

400

Sidebar:
- NETWORK
- SEARCH
- COLLECTION NE
- DISTRIBUTION NE
- FLEX NE
- MAPPING SCRIPT DEFINITION
- ASSOCIATE MAPPING SCRIPT
- CORRELATION/AGGREGATION
- ASSOCIATE CORRELATION/AGGREGATION
- RESOURCES
- ASSOCIATIONS
- GENERIC DB
- TABLES
- ADMIN
- CONFIGURATION
- GT TABLES
- ONE 2 ONE
- SUBSYSTEMS
- SUPPORT
- LOGOUT

FIG. 13

| NETWORK | UPDATE EVENT CORRELATION/AGGREGATION CONFIGURATION |
|---|---|
| SEARCH | |
| COLLECTION NE | ATTRIBUTES \| SOURCE RECORD \| RELATED RECORD |
| DISTRIBUTION NE | MATCHING CRITERIA \| ASSEMBLY CRITERIA \| ASSEMBLY SPEC |
| FLEX NE | |
| MAPPING SCRIPT DEFINITION | EVENT CORRELATION/AGGREGATION NAME: CORRELATION VOICE 1 |
| ASSOCIATE MAPPING SCRIPT | |
| CORRELATION/AGGREGATION | EVENT CORRELATION/AGGREGATION TYPE: |
| ASSOCIATE | [ VOLUME BASED ▶ ] |
| CORRELATION/AGGREGATION | |
| RESOURCES | VOLUME: *(REQUIRED) |
| ASSOCIATIONS | [ 100 ] |
| GENERIC DB | (NUMBER OF RECORDS) |
| TABLES | |
| ADMIN | ◀ GO BACK \| CONTINUE ▲ \| CLOSE ⊠ |
| CONFIGURATION | |
| GT TABLES | |
| ONE 2 ONE | |
| SUBSYSTEMS | |
| SUPPORT | |
| LOGOUT | |

| NETWORK | UPDATE EVENT CORRELATION/AGGREGATION CONFIGURATION |
|---|---|
| SEARCH | |
| COLLECTION NE | ATTRIBUTES \| SOURCE RECORD \| RELATED RECORD |
| DISTRIBUTION NE | MATCHING CRITERIA \| ASSEMBLY CRITERIA \| ASSEMBLY SPEC |
| FLEX NE | |
| MAPPING SCRIPT DEFINITION | EVENT CORRELATION/AGGREGATION NAME: CORRELATION VOICE 1 |
| ASSOCIATE MAPPING SCRIPT | |
| CORRELATION/AGGREGATION | EVENT CORRELATION/AGGREGATION TYPE: |
| ASSOCIATE CORRELATION/AGGREGATION | TIME BASED ▸ |
| RESOURCES | TIME: *(REQUIRED) |
| ASSOCIATIONS | [          ] |
| GENERIC DB | (TIME IN SECONDS) |
| TABLES | |
| ADMIN | TIME LIMIT TYPE: |
| CONFIGURATION | ⦿ FIXED |
| GT TABLES | ○ RESET |
| ONE 2 ONE | |
| SUBSYSTEMS | TIME LIMIT EXPIRES WITHOUT COMPLETION OF EVENT CORRELATION:: |
| SUPPORT | ⦿ ASSEMBLE THE ACCUMULATED RECORDS WITH NO FURTHER ACTION |
| LOGOUT | ○ ASSEMBLE THE ACCUMULATED RECORDS AND DISTRIBUTE |
| | ○ PLACE THE ACCUMULATED RECORDS IN AN ERROR DIRECTORY |
| | ▾ GO BACK \| CONTINUE ▴ \| FINISH ⓘ \| CLOSE ☒ |
| | 412 |

UPDATE EVENT CORRELATION/AGGREGATION CONFIGURATION

[ATTRIBUTES] [SOURCE RECORD] [RELATED RECORD]
[MATCHING CRITERIA] [ASSEMBLY CRITERIA] [ASSEMBLY SPEC]

TYPE RULES OR USE THE LISTS AND BUTONS BELOW TO ADD THEM:

CHECK SYNTAX

SUBRECORD [CORE ▼]  [ADD SUBRECORD]   ADD RULE STRUCTURE
FIELD [ORIG_STG(13) ▼]  [ADD FIELD]    ( ) < <= > >= = —
VALUE [BETWEEN ▼]  [ADD VALUE]         @ != AND OR NOT + —
KEYWORD [ ▼]  [ADD KEYWORD]

```
BODY
BEGIN
  OPEN SOURCE.CORE
  CREATEMOR VOICE
  CREATESUBRECORD CORE AS CORE1
    SETFIELD CORE1::MOBILE_ESN_IME1=SOURCE.CORE::MOBILE_ESN_IME1
    SETFIELD CORE1::MOBILE_ROLE=SOURCE.CORE::MOBILE_ROLE
  ENDCREATEMDR
  LOOPCALLRECORD RELATED
    OPEN RELATED.CORE
      SETFIELD core1::MOBILE_ESN_IME1=RELATED.CORE::MOBILE_ESN_IME1 +
        $CORE1::MOBILE_ESN_IME1
    CLOSE
  ENDLOOPCALLRECORD
```

GOTO LINE NUMBER [0] [GO]  [FIND          ] [FIND/REPLACE]
[◀ GO BACK] [CONTINUE ▲] [FINISH ☺] [CLOSE ☒]   [RESET]

416

Left menu:
- NETWORK
- SEARCH
- COLLECTION NE
- DISTRIBUTION NE
- FLEX NE
- MAPPING SCRIPT DEFINITION
- ASSOCIATE MAPPING SCRIPT
- CORRELATION/AGGREGATION
- ASSOCIATE CORRELATION/AGGREGATION
- RESOURCES
- ASSOCIATIONS
- GENERIC DB
- TABLES
- ADMIN
- CONFIGURATION
- GT TABLES
- ONE 2 ONE
- SUBSYSTEMS
- SUPPORT
- LOGOUT

| | ASSOCIATE EVENT CORRELATION / AGGREGATION CONFIGURATION |
|---|---|
| NETWORK | |
| SEARCH | SELECT THE DATA TYPE FOR SEARCH: |
| COLLECTION NE | |
| DISTRIBUTION NE | SELECT ONE ▶ |
| FLEX NE | ASSOCIATION NAME: |
| MAPPING SCRIPT DEFINITION | SELECT ONE ▶ SEARCH |
| ASSOCIATE MAPPING SCRIPT | |
| CORRELATION/AGGREGATION | SELECT DATA TYPE FOR ADD: |
| ASSOCIATE | VOICE ▶ |
| CORRELATION/AGGREGATION | ASSOCIATE |
| RESOURCES | |
| ASSOCIATIONS | ACTION NAME     MDU TYPES     ACTIVE?  USER      DATE/TIME |
| GENERIC DB | EXAMPLE_ACTION 1  MDU_TYPE_1     Y     NAME_1  09/12/## 15:15 |
| TABLES | EXAMPLE_ACTION 2  MDU_TYPE_2     N     NAME_2  09/12/## 13:23 |
| ADMIN | |
| CONFIGURATION | ASSOCIATE |
| GT TABLES | |
| ONE 2 ONE | |
| SUBSYSTEMS | |
| SUPPORT | |
| LOGOUT | |

| | UPDATE EVENT CORRELATION/AGGREGATION ASSOCIATION |
|---|---|
| NETWORK | |
| SEARCH | NAME: *(REQUIRED) EVENT CORRELATION/AGGREGATION CONFIGURATION(S): |
| COLLECTION NE | CALLVOICE1   CORRELATION VOICE1 ▸ |
| DISTRIBUTION NE | |
| FLEX NE | NOTES: |
| MAPPING SCRIPT DEFINITION | ◂   ▸ |
| ASSOCIATE MAPPING SCRIPT | |
| CORRELATION/AGGREGATION | |
| ASSOCIATE | |
| CORRELATION/AGGREGATION | STATUS:  ○ ACTIVE    ⊙ INACTIVE |
| RESOURCES | EFFECTIVE DATE AND TIME: |
| ASSOCIATIONS | IF YOU DO NOT SELECT A DATE RANGE, BY DEFAULT ALL THE RECORDS WILL BE SELECTED |
| GENERIC DB | START DATE: |
| TABLES | -MONTH- ▸  -DAY- ▸  -YEAR- ▸  -HOUR- ▸  -MINUTE- ▸  -SECOND- ▸ |
| ADMIN | STOP DATE: |
| CONFIGURATION | -MONTH- ▸  -DAY- ▸  -YEAR- ▸  -HOUR- ▸  -MINUTE- ▸  -SECOND- ▸ |
| GT TABLES | SOURCE COLLECTION NE(S): |
| ONE 2 ONE | TESTCOLNOV ▸ |
| SUBSYSTEMS | |
| SUPPORT | RELATED COLLECTION NE(S): ☑ DIVS_LUCENT  ☐ DIVS_TEST  ☐ TESTCOLNOV |
| LOGOUT | FINISH   CLOSE |

FLEXIBLE EVENT CORRELATION AGGREGATION TOOL

CROSS REFERENCE TO RELATED APPLICATIONS

The present application is related to a co-pending and commonly-owned application filed on even date herewith, the disclosure of which is hereby incorporated by reference in its entirety: "Flexible Network Element Interface", Ser. No. 10/190,728 to Chandramouli Swarna, Rejithet Ramachandran, Niraj Desai, Vijayekku Murugaiah, and Jayakuma Kuppuswamy. A co-pending application having at least one common inventor is entitled "Scripting Designer for A Mediation Billing System" Ser. No. 10/724,955 to Rejithet Ramachandran, Chandramouli Swarna, Niraj Desai, and Pankaj Patel.

FIELD OF THE INVENTION

The present invention pertains to a data management system for real-time collecting and distributing data, and more particularly, for correlating and assembling revenue generating transaction data from one or more collection points for distributing to billing-related systems such as a billing system, fraud system, rating system, write-off system, and a clearing house outcollects.

BACKGROUND OF THE INVENTION

Communication service providers in the recent past have represented three different markets: wireless, fixed line (Internet Protocol (IP)/wireline) and cable/broadband. Each service was separately provided through dedicated hardware and software and separately priced. Usage for billing purposes was a straightforward matter of monitoring time of usage, for instance.

Access providers are those service providers that provide IP connectivity between the end subscriber and the Internet, which can be characterized as providing a "communication" role in this value chain. These access providers are already experiencing a shift away from dial-up access to "always-on" broadband connections to homes and businesses. Content providers provide the video, text, voice and data that are communicated by the access providers. These content providers are experiencing a shift from a small number of communication formats to a large variety of formats.

Technological advances and customer demand for integrated access to a variety of voice, video and data services is increasingly causing a convergence in these markets. In particular, varied services such as basic e-mail, internet access, voice-over-IP (voIP), video mail are being provided as bundled service for use over a wide variety integrated devices, such as PCs, wireless phones, personal digital assistants (PDA), and Internet appliances. As used herein, xSPs, are defined as providers of IP-based services: wireless, cable/broadband, Internet Service Providers (ISPs), Application Service Providers (ASPs), wireline and next-generation service providers.

xSPs are beginning to launch multiple services by aggregating content through partnerships with content owners. Being first to market with bundled service packages, these xSPs will be presented with great opportunities and great challenges to woo and win customers by offering new margin-rich services. But in order to retain the customer, win market share, and derive profits for the long term, these xSPs must have customer care and billing services that work in this complex new environment. Thus, once a customer is provisioned, mediation—capturing and measuring usage from different network elements—is the next hurdle in the multi-market, multi-service, multi-business model. Traditionally, all mediation by an xSP tended to be self-contained within that xSP's operation.

As networks increase in complexity and the value of real-time information expands, the ability to quickly and easily manage network changes and multiple formats is growing as well. Acting as the isolation layer, mediation systems such as Real-Time Processing Manager (RPM) advantageously provides the reliable data handling necessary to interface between ever-changing network elements and applications. The RPM enables operators to quickly introduce new services and change existing services. The module simultaneously supports existing network infrastructures as well as evolving infrastructures, enabling billing for events generated using network technologies such as TDMA (Time Division/Demand Multiple Access), CDMA (Code Division Multiple Access), GSM (Global System for Mobile Communication), GPRS (General Packet Radio Service), UMTS (Universal Mobile Telecommunications System), and CDMA2000.

Acting as the communications gateway for the collection of events, the RPM ultimately results in increased revenue for the service provider via accurate and reliable delivery of network usage data. RPM supports high-capacity data collection from multiple networks. It acts as collector, aggregator, reformatter, and distributor, enabling standardized processing of usage information generated in multi-vendor, multi-service networks. The Web-based user interface places more power into the hands of the user, lowering total cost of ownership by enabling the operator to configure and maintain the application regardless of the chosen delivery option. Configurable business rule definition, filtering, duplicate and gap checking, error processing, and other user definable parameters offer maximum flexibility in usage processing. This fully functional, modular application supports multiple market segments and technologies simultaneously, enabling the service provider to have a single, convergent mediation platform upon which to support its business needs. The RPM supports both prepaid and postpaid networks in a single mediation environment, enabling the carrier to provide diverse services to its customers without sacrificing revenue assurance, flexibility, and control. Also, since the RPM serves as a transparent isolation layer between applications and service/network elements, the impact to the systems with which it interfaces is minimal.

Supporting both circuit-switched as well as IP networks, the RPM application provides a simplified and standardized interface for the acquisition of billing data. Its capabilities include: (a) convergent pre-paid and post-paid mediation support; (b) event validation, editing, gap and duplicate checking; (c) error correction (individual and mass); (d) carrier control of event collection processes via GUI/table-driven parameters; (e) event aggregation, reformatting, event correlation, and call assembly; (f) enterprise-specific field validation, business validation, data manipulation rules; (g) filtering and grouping; (h) reformat definition/application; (i) revenue assurance: audits and controls with extensive reporting and analysis; (j) mediation data record search capability; (k) role-based security; (l) multi-standard roamer processing.

Thus, known mediation systems such as RPM have a number of desirable features, such as succeeding in gathering usage data from various types of network elements (NE) and distributing processed usage data to various billing-related systems. However, customers for RPM often have specific needs to interface to new network elements as collection points. Furthermore, the desired billing arrangements with customers often require correlating events contained in the usage data and to assembly the records. This correlation and aggregation of events is complicated by the diverse types of services represented by the different network elements 18 and the needs of the billing-related systems 30. For example, a single billable transaction may entail a communication event that includes multiple connections or handoffs, reflected in multiple usage data records that need to be combined. As another example, a customer desires to have a bill that reflects the total time duration of the transaction events (e.g., audio or video communication). In yet another example, the type of communication comprises a brief transaction such as a financial electronic data transfer wherein the volume of transactions (i.e., number of events) is the basis of the billing. In yet another example, specific accounts are to be billed, which requires identifying matching usage data from the various network elements that corresponds to each specific account. Correlating and assembling event data is complicated by having related usage data arrive in any sequence, records may be in error or duplicative, may arrive in a different data type format.

Conventional RPM applications address these needs by developing specifically tailored correlation and aggregation functions of known network elements and billing-related systems. These functions are coded, compiled, and distributed with the application. The customers for the RPM application are limited to using these pre-existing event correlation/aggregation functions.

Consequently, a significant need exists for a network element data handler for a mediation system for a converged network system for that may be configured by the xSP customer.

BRIEF SUMMARY OF THE INVENTION

The invention overcomes the above-noted and other deficiencies of the prior art by providing a mediation manager that has an event correlation/assembly capability that is readily configurable by a user. The ability to configure the correlation and assembly allows the mediation manager to rapidly respond to changes in a converged network system. In particular, a data handler of the mediation manager does not have to be updated by rewriting, recompiling and redistributing each time that an xSP operating network, from where revenue related transaction data is generated, is modified. Similarly, the data handler does not have to be updated each time that billing-related systems, that use the data, are modified. Thereby, time delays and additional expense are avoided by xSP's who are customers for mediation managers.

In one aspect of the invention, a Flexible Network Element Interface identifies usage data records that are related, matches records by criteria, and assembles records. Assembling records involves populating information from one record into another record or creating a new record by populating the information from all the input records. In particular, one record can be assembled with exactly one record to produce one assembled record; one record can be assembled with many other records within a network element to produce one assembled record; or one record can be assembled with many other records within a network element to produce many assembled records. Furthermore, the above assembly operations may be done within a given Network Element or across multiple Network Elements. Moreover, these functions for correlating and assembling records by the Flexible Network Element Interface are configured by the user through a Graphical User Interface (GUI).

These and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 10 is an event correlation/aggregation configuration window of the Flex NE GUI of FIG. 9.

FIG. 11 is an attributes window of the maintain flexible call assembly configuration GUI referenced in the Flex NE GUI of FIG. 9.

Figure 13:
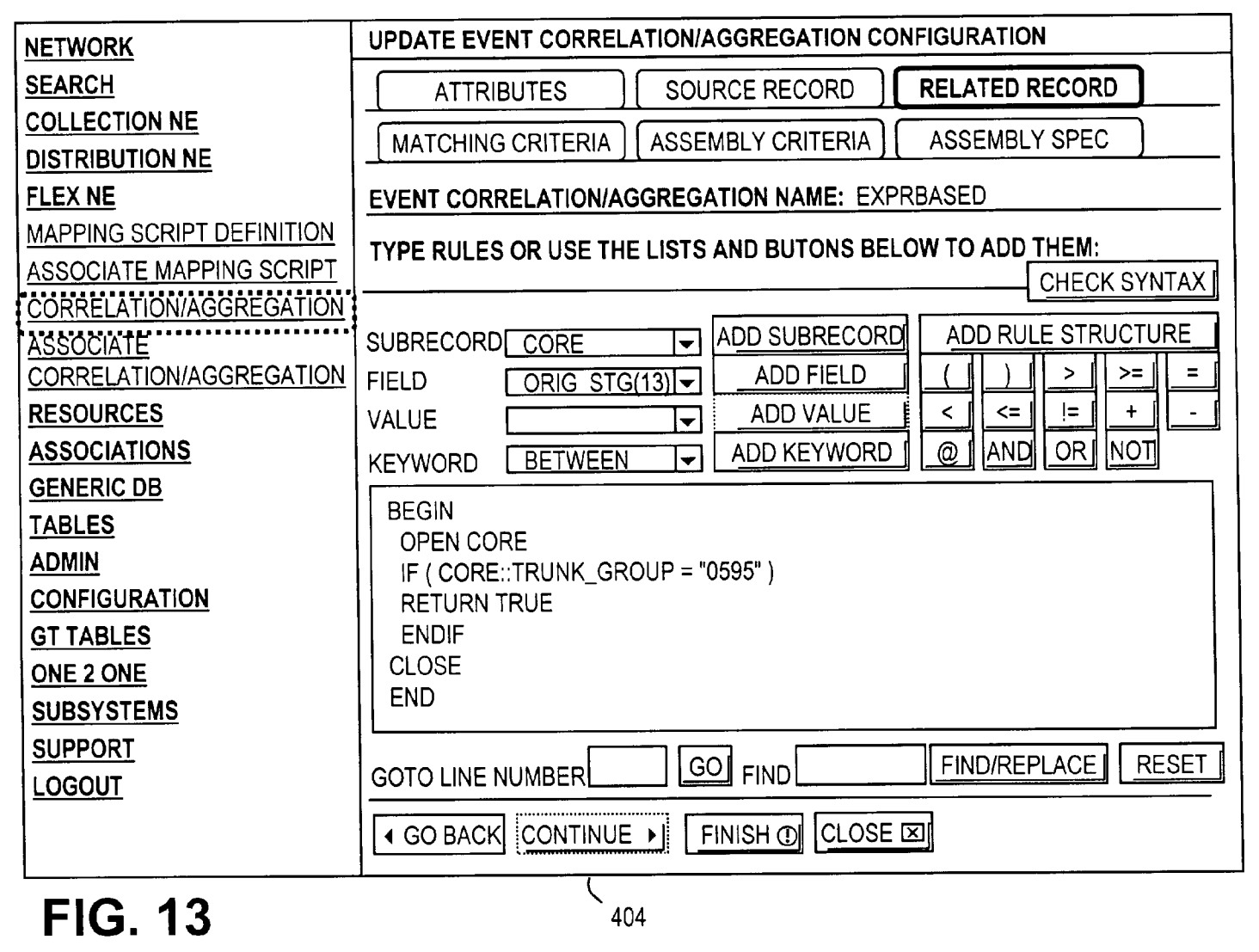

FIG. 13 is a related record window of the maintain flexible call assembly configuration GUI referenced in the Flex NE GUI of FIG. 9.

FIG. 15 is a volume-based window of the assembly criteria GUI referenced in the Flex NE GUI of FIG. 9.

FIG. 16 is a time-based window of the assembly criteria GUI referenced in the Flex NE GUI of FIG. 9.

Figure 17:
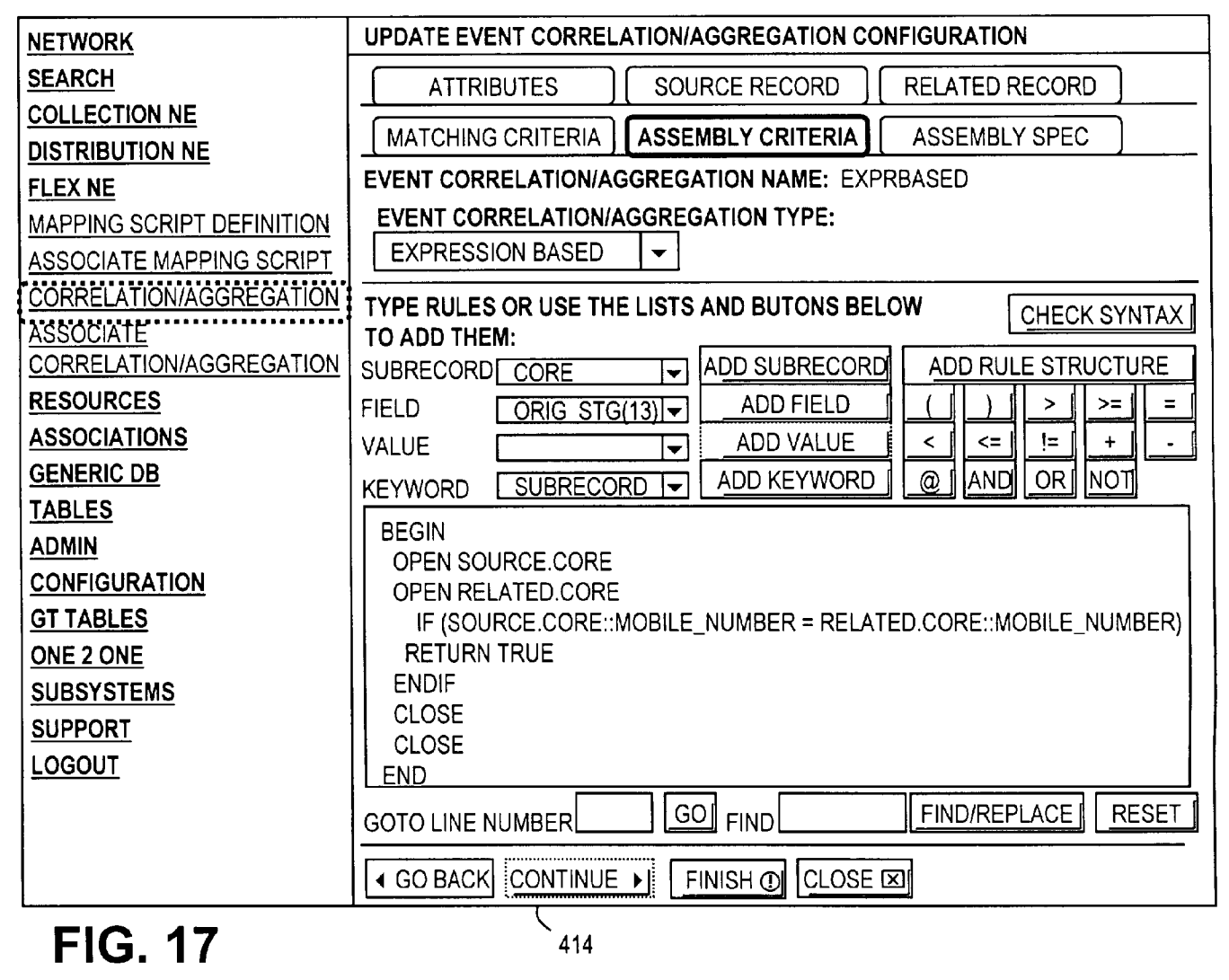

FIG. 17 is an expression-based window of the assembly criteria GUI referenced in the Flex NE GUI of FIG. 9.

FIG. 18 is an assembly specification window of the maintain flexible call assembly configuration GUI referenced in the Flex NE GUI of FIG. 9.

FIG. 19 is an associate event correlation/aggregation configuration window of the of the Flex NE GUI of FIG. 9.

FIG. 20 is an update associate event correlation/aggregation configuration window of the of the Flex NE GUI of FIG. 9.

DETAILED DESCRIPTION OF THE INVENTION

Mediation Manager

Figure 1:
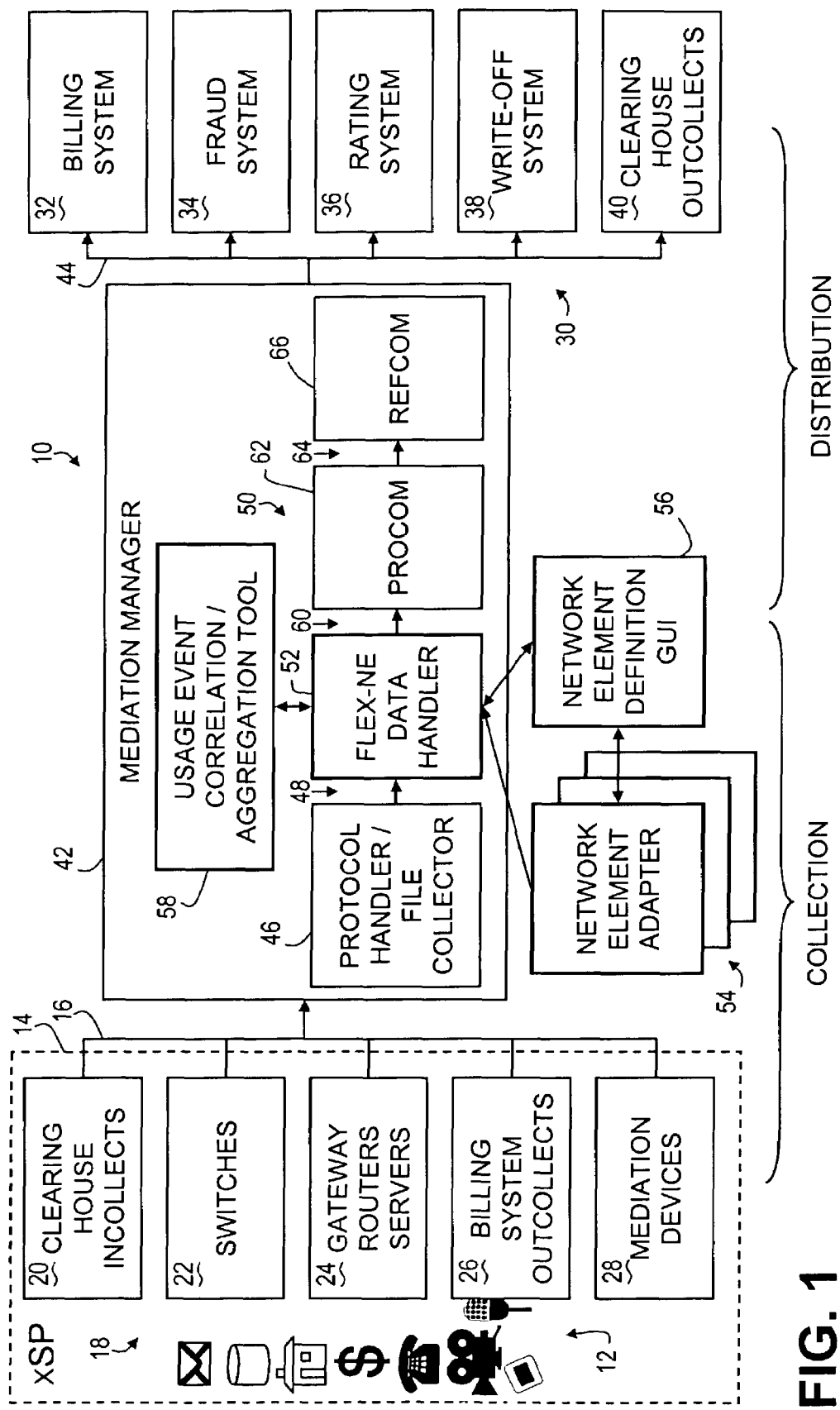
FIG. 1 is a diagram of a converged network system for providing xSP services wherein a mediation manager consistent with the present invention provides an interface for revenue generating transaction data.

With reference to the Drawings, wherein like numbers refer to like components through the several views, FIG. 1 depicts a converged network system 10 for providing xSP (i.e., any service provider of Information Technology (IT)/business services) content 12 to customers via an xSP operator network 14. Examples of xSP content 12 include e-mail, Internet access, voice-over-IP (voIP), video mail, Simple Mail Transfer Protocol (SMTP) or Multipurpose Internet Mail Extensions (MIME) wireless, H.323 Serial Interface Protocol (SIP) data, MPEG (Moving Picture Experts Group Audio/Video, HTTP (Hyper Text Transfer Protocol) data, etc. Delivery of the xSP content 14 gives rise to revenue generating transaction data (usage data) 16 that is collected by a plurality of network elements (NEs) 18, such as clearing house incollects 20, switches 22, gateway routers/servers 24, billing system outcollects 26 and mediation devices 28.

Each of these types of NEs 18 tends to reflect different types of xSP content 12 and to be developed by different vendors. Consequently, the usage data 16 is generally raw data in different formats with varying types of information content. The usage data 16 is raw in that it tends to include errors, such as duplicate records and invalid data. The nature of the usage data 16 makes difficult its use by xSP billing-related systems 30, such as a billing system 32, a fraud system 34, a rating system 36, a write-off system 38, and a clearing house outcollect 40. Consequently, a Mediation Manager 42 consistent with the present invention collects the usage data 16 from the NEs 18 and distributes validated, reformatted data 44 to the xSP billing-related systems 30.

The Mediation Manager 42 accomplishes this collection of the message-based and/or file-based usage data 16 with a protocol handler/file collector 46, which receives the usage data 16 from the physical device/external device of the respective NE 18, checking for some common functionality. Thus, received data 48 is thereafter given to a Flexible Network Element Interface ("Flex NE") 50 that processes the received data 48 into a standardized format, which in the illustrative embodiment is termed ASCII Positional Variable (APV), for further manipulation and processing. The Flex NE data interface 50 includes a Flex NE data handler 52 that is configured by one or more network element adapters 54 for the various data formats of received data 48, corresponding to different types of NEs 18. These adapters 54 may be bundled with the Mediation Manager 42, transmitted to the client for plugging into a fielded Mediation Manager 42, or created via a Network Element Definition Graphical User Interface (GUI) 56.

The Flexible NE Interface 50 includes a usage event correlation/aggregation tool 58 that advantageously interacts with the Flex NE data handler 52 to perform call assembly. Call assembly includes matching records from a plurality of collection points. As an illustrative but not all inclusive list, the Flexible Network Interface 50 of the Mediation Manager 42 supports at least the following types of call assemblies: (1) Voice Touch (Assembling Administrative Records with multiple Connected Call Records); (2) Directory Assisted Call Completion (i.e., assembling Administrative Records with multiple Connected Call Records); (3) Lucent Data Services (i.e., assembling Packet Data Protocol (PDP) Records with Master Data Packet (MDP) records); (4) GPRS (i.e., assembling Server GPRS Serving/Support Node (SGSN) and Gateway GPRS Serving/Support Node (GGSN) records); (5) VoIP (i.e., assembling Start and Stop records); and (6) Ericsson Toll Ticket Assembly. One purpose of the Flexible NE Interface 50 is to provide a single and flexible call assembly capability that resolves all different call assembly scenarios, is user configurable, and supports call assembly across one or multiple Network Elements 18.

With collection completed by the Flex NE data handler 52, the Mediation Manager 42 transfers collected data 60 to a process manipulator ("Procom") 62 for field and business validation and data manipulation. Procom 62 performs functions such as locating duplicates or gaps in the collected usage data, range errors in specific fields, and substitutions of data based on specified criteria. Validated data 64 from Procom 62 is then processed by a distribution reformatter ("Refcom") 66, which reformats and directs portions of the validated data 64 as appropriate to its destination in the xSP billing-related systems 30.

Figure 2:
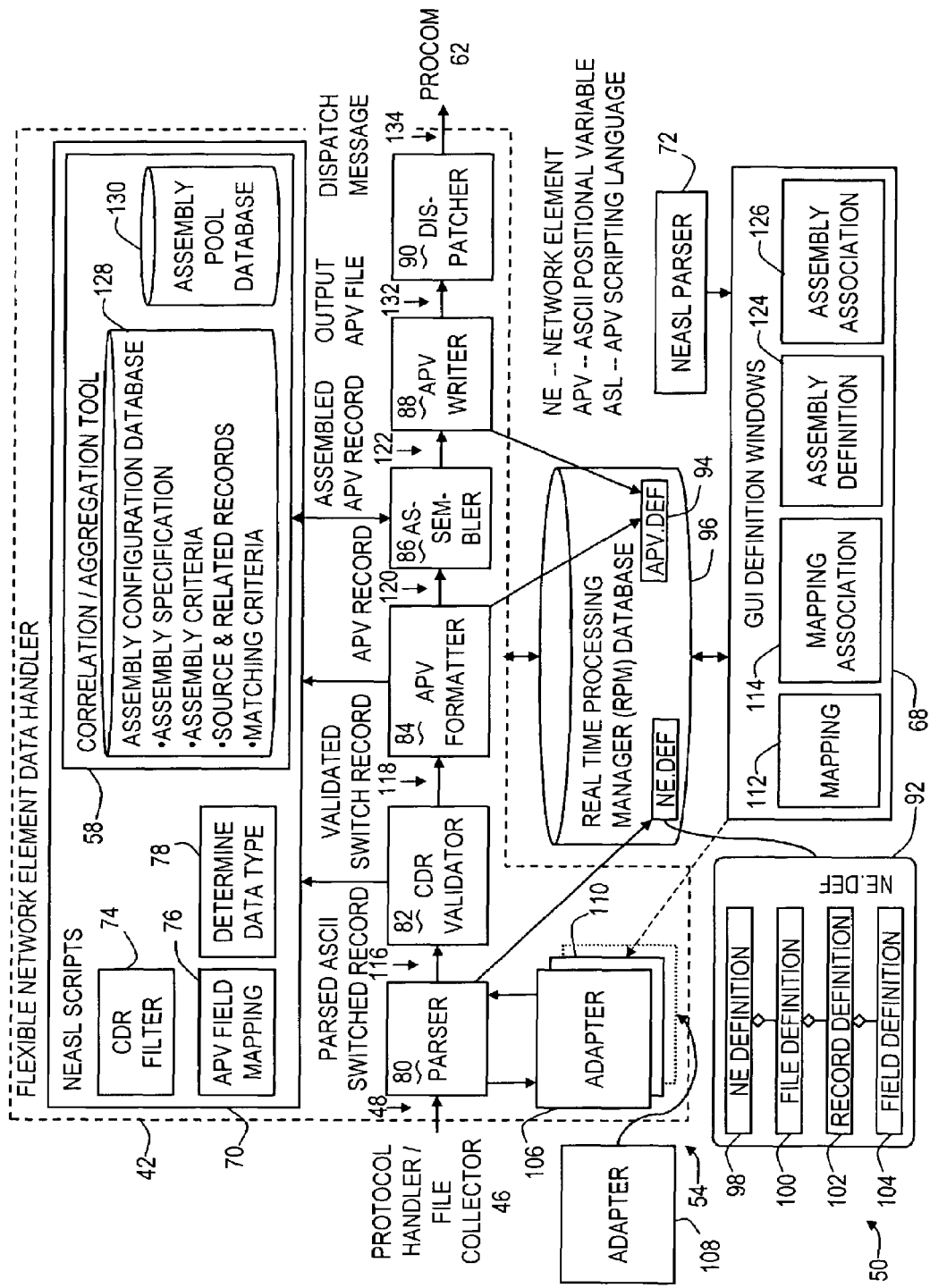
FIG. 2 is a diagram of Flexible Network Element (Flex NE) Interface of the Mediation Manager of FIG. 1.

FIG. 2 depicts in greater detail the Flex NE Interface 42 for advantageously completing collection processing of the received data 48 by formatting any type of usage data 16 into APV format using an adaptive and interactive approach. In particular, a Graphical User Interface (GUI), presented as GUI definition windows 68, are interpreted by the Mediation Manager 42 via a precompiled network element APV scripting language (NE ASL) scripts 70, parsed by an NE ASL parser 72. Examples of precompiled NE ASL scripts 70 include a CDR filter script 74 (event bypassing) for determining format errors, an APV field mapping script 76 (event mapping) for converting CDR to APV, and a determine data type script 78 for detecting types such as attribute value (AV), ASCII, XML, ASN.1, VCD/BCH/BIN, etc.

NE ASL Scripts

The NE ASL Scripts 70 advantageously enables multiple functions to be performed by the Flex NE Interface 50, including the following: (1) filtering switch records (usage data) based on a expression; (2) identifying the data type (APV type) of switch records; creating APV records dynamically by mapping the switch record fields into newly created subrecords; (3) identifying a type of an APV record in assembly whether it is a Source or Related; (4) assembling the APV records into one or more APV records; and (5) specifying criteria for the assembly as a simple expression using the NEASL.

In some cases the scripting language alone will not be able to satisfy the requirements for more complex computations. In such scenarios simple interface points to the server side processes may be used in the scripts to achieve this functionality. The following abilities are provided by the NE ASL Objects: (1) publishing interface points from the mediation manager processes that the scripting language can make use of; (2) provide the ability for the scripting language to delegate more complex computations as well as table driven operations to Unix processes; and (3) extending the scripting language so that the scripting language can act as an integrator to achieve complex functionality.

The Common Object is a general-purpose object that allows the user to manipulate the MDR. The format to call the Common Object is: "subrecord::field=@Common.method (argument1, argument2, argument3, argument4, argument5)". The list of methods available in @Common object are shown in Table 1:

TABLE 1

| Method name | Arguments | Return type | Meaning |
| --- | --- | --- | --- |
| strcat | string, string | string | Attach first-string argument to second-string argument and returns the attached strings. |
| strlen | String | number | Return the length of the string argument |
| MapValue | string1 map name for use, string2 value for lookup | string | Returns value from input string that compares to a table value. |
| aton | String | number | Take the string values and returns a numeric representation. |
| SysDate | None | datetime | Return the system date and time |
| SysDateAfterN | String | datetime | Return the system date and time, plus the number of days |
| SubStr | string, start position number, length | string | Return a (reads left to right) sub-string of the string based on the start position and length. Note the first possible position is 0. |
| RevSubstr | Arguments: string, start position number (start position counts from right to left), length (from left to right similar to SubStr) | string | Return a Reverse (reads right to left) sub-string of the string based on the start position and length. Note the first possible position is 0 (start position counts from right to left). |
| strip | Arguments: string, string (L for leading, T for trailing, B for both), string (" " default for zeros otherwise specify the character to strip). | String | strip leading characters, trailing characters or both from the string. |
| Seconds2HHMISS | seconds | string | return an all seconds field to a format of HHHMISS format. |
| RandomNumber | Number | number | Return a random number. For example if 100 is passed, it returns a number 0 through 99 |
| UTC | 5 Character String((+/−)HHMM) | Number | Returns a second. For example if you pass +1010, it returns 36600 |

The Reference Data object allows a user to use reference data. The format to call the reference Data object is: "@ReferenceData.method (subrecord::field)="string to compare from reference data lookup". Note: "field" must be a type of string. The following Table 2 shows the set of methods in ReferenceData:

TABLE 2

| Method name | Arguments | Return type | Meaning |
| --- | --- | --- | --- |
| GetNumberType | String | string | Return a string from the SID Range table based on the passed string. |
| GetSID | String | String | Return the SID based on the number passed. |

TABLE 2-continued

| Method name | Arguments | Return type | Meaning |
| --- | --- | --- | --- |
| GetTLDNFlag | String | Number | Returns the flag. |

The Event Correlation/Aggregation link in GUI allows to define various scripts needed for assembly of APV records: (1) Source Record Identification; (2) Related Record Identification; (3) Matching Criteria; (4) Assembly Criteria; and (5) Assembly Specification.

The Source Record Identification script is used for identifying the source record for assembly. For example in VT/DACC this is the identification of the admin record. This might require looping through the list of APV Sub records within a MDR like in GPRS.

```
RECORD_IDENTIFICATION
BEGIN
#GUI entry starts from here
        BEGIN
        LOOP
IF GPRS::CHARGINGID = 0 AND GPRS::PDP_ADDRESS != NULL THEN
RETURN TRUE
ENDLOOP
END
#GUI entry ends from here
END
```
This script's return value is based on the execution of RETURN Statement TRUE or FALSE and has the following possible instruction set:
BEGIN - END
LOOP - ENDLOOP
IF - ELSE - ENDIF
RETURN
The Related Record Identification script is used for identifying the related records for a particular source record. For example, in VT / DACC this is the identification of the base record. This might require looping through the list of APV Sub records within a MDR like in GPRS.
```
RECORD_IDENTIFICATION
BEGIN
#GUI entry starts from here
BEGIN
        LOOP
IF GPRS::RELATED_CHARGINGID = 16 OR GPRS::RELATED_CHARGINGID = 17
AND
GPRS::PDP_ADDRESS != NULL THEN
RETURN TRUE
LOOP END
END
#GUI entry ends from here
END
```
This script's return value is based on the execution of RETURN Statement TRUE or FALSE and has the following possible instruction set:
BEGIN - END
        LOOP - ENDLOOP
        IF - ELSE - ENDIF
        RETURN
The Matching Criteria script is used for determining the matching criteria between the source and the related records. Here the script is able to refer to fields from 2 different MDRs:
```
MATCHING_CRITERIA
BEGIN
#GUI entry starts from here
BEGIN
        SOURCE_RECORD.GPRS::CHARGINGID ==
RELATED_RECORD.RELATED_CHARGING_ID
END
#GUI entry ends from here
END
```
This script returns based on the execution of RETURN Statement TRUE or FALSE and has the following possible instruction set:

```
            BEGIN - END
            LOOP - ENDLOOP
            IF - ELSE - ENDIF
            RETURN
The Assembly Specification script is used for specifying the for assembling the source
and the related records. This script requires looping through the list of related records
(MDRs) and for each related or source record, looping through the list of APV Sub
records.
ASSEMBLY_SPECIFICATION
BEGIN
#GUI entry starts from here
BEGIN
CREATEMDR GPRS
CREATESUBRECORD GPRS AS GPRS1
            GPRS1::PDP_ADDR +=
SOURCE_RECORD.GPRS::PDP_ADDR
            LOOP RELATED_RECORDS
                    LOOP GPRS (Nested Loops though not applicable in
GPRS as there is only one GPRS sub record)
                    GPRS1::PDP_ADDR+=RELATED_RECORD.GPRS::PDP_ADDR
                    ENDLOOP
            ENDCREATESUBRECORD
ENDCREATEMDR
END
#GUI entry ends from here
END
The Assembly Criteria script returns the assembled APV RPM_MDR object created
while execution of the script. The possible instruction set is the following:
CREATEHEADER
            BEGIN - END
            LOOP - ENDLOOP
            IF - ELSE - ENDIF
            CREATEMDR - ENDCREATEMDR
            CREATESUBRECORD
            SETFIELD
            LOOPCALLRECORD - ENDLOOPCALLRECORD
```

The Assembly Criteria may be (1) volume based upon on the number of records in the assembly pool; (2) time based upon the assembly threshold time; or (3) expression based upon an assembly criteria script in the NE ASL Scripts 70:

```
            ASSEMBLY_CRITERIA
            BEGIN
            #GUI entry starts from here
            BEGIN
            # EXPRESSION for assembly
            GPRS::PDP_ADDR = 1
            END
            #GUI entry ends from here
            END
```

The return value from the assembly criteria script is about the successful execution of script. The form of return for this script depends upon evaluation of expression and would be either TRUE or FALSE.

Collection Processing Flow

Returning to FIG. 2, the NEASL Scripts 70 are used to convert usage data 16 into collected data 60. In particular, the conversion processing flow of the Flex NE interface 50 is performed in turn by a Parser 80, a Call Detail Record (CDR) validator 82, an APV formatter 84, an assembler 86, an APV writer 88, and a dispatcher 90. Each stage 80-90 of the Flex NE interface 50 is configured by using the NE ASL scripts 70 and by accessing interactively configured definitions for the format of the received data 48, depicted as "ne.def" metadata 92, and an APV definition for an assembled APV record, depicted as "apv.def" metadata 94. The definition files ne.def metadata 92 and apv.def metadata 94 are both stored in a real-time processing manager (RPM) database 96.

The ne.def metadata 92 includes an NE definitions superclass 98 having an aggregation association with file definition 100, which further has an aggregation association with record definition 102, which in turn has an aggregation association with field definition 104.

The parser 80 parses and stores the received data 48 into the format that is specified for the given NE 18 in the ne.def metadata 92. In addition, the parser 80 converts the raw received data 48 into an ASCII format that may be viewed via the GUI definition windows 56. The parser 80 also identifies received data 48 that cannot be decoded/parsed for processing by an error manager.

The parser 80 is configured by the plurality of adapters 54, which may include a bundled adapter 106 that was included with the Flex NE interface 50, a downloaded adapter 108 which is received after installation of the Flex NE interface 50, and an interactively defined adapter 110 produced via the GUI definition window 68, depicted as mapping windows 112 and mapping association windows 114. The parser 80 produces thereby a parsed ASCII switched record 116 to the CDR validator 82. Additional description of the parser 80 and adapters 54 are provided in a co-pending and commonly-owned application entitled "Flexible Network Element Interface" to Swarna, et al., filed on even date herewith and incorporated by reference in its entirety.

For a given NE 18, a user specifies the required validation rules for all CDR types via GUI using NE ASL scripts 70. The CDR validator 82 checks the CDR against those specified validation rules, created with the CDR filter scripts 74. If validation succeeds, then the CDR becomes a validated switch record 118 that will be further processed. If validation fails, those CDRs will be processed by the error manager.

Once a call detail record (CDR) is decoded and validated, APV formatter 84 converts the validated switch record 118 into an APV record 120 in accordance with the associated CDR to APV mapping rules defined in the apv.def metadata 94, created with the APV field mapping scripts 76. With the usage data 16 now in the standardized format of the APV record 120, collection is complete and distribution processing begins.

The assembler 86 correlates and aggregates the APV records 120 into assembled APV records 122. The assembly definition and association windows 124, 126 define first record identification, other record(s) identification, matching criteria, assembly criteria, assembly topology that are stored in an assembly configuration database 128 as an assembly specification, assembly criteria, source and related records definition, and matching criteria. The unassembled APV records 120 are temporarily stored and manipulated in an assembly pool database 130, which like the assembly configuration database 128, is part of the correlation/aggregation tool 58. Management of the assembly pool database further includes reporting on unmatched APV records 120, reconciliation of assembled APV records 122, and purging of the assembly pool database 130.

In the illustrative embodiment, the correlation/aggregation tool 58 supports various types of call assemblies to include Voice Touch (Assembling Admin Records with multiple Connected Call Records); Directory Assisted Call Completion (Assembling Admin Records with multiple Connected Call Records); Lucent Data Services (Assembling PDP Records with MDP records); GPRS (Assembling SGSN and GGSN records); VoIP (Assembling Start and Stop records); and Ericsson Toll Ticket Assembly. The correlation/aggregation tool provides a generic call assembly capability for the above-mentioned types of assembly as well as others. The components of the Flexible NE Assembler include the GUI, which is responsible for specifying assembly rules; include the which is responsible how to interpret and store the Scripting language commands; and include the Assembler, which is the module responsible for doing actual call assembly in accordance to the configuration rules.

Assembling any two records consist of the following steps. (1) Identification of Records: An assembly related record may be identified either by one field or group of fields in the record. (2) Matching Criteria: Two related records can be assembled through some criteria. The criteria may be as simple as check for one field or check for multiple fields with multiple expressions. (3) Assembly Process: This involves populating information from one record into another record or creating a new record by populating the information from all the input records.

The Assembly Topology may be (1) one record assembled with exactly one record to produce one assembled record, (2) one record assembled with many other records within a network element to produce one assembled record, and (3) one record assembled with many other records within a network element to produce many assembled records. Moreover, each of the above assembly operations may be done within a given Network Element or across multiple Network Elements, but of similar type. It will be appreciated that each may further be done across multiple Network Elements of different types.

Following examples illustrate configuring an assembly:

---

Example 1: Voice Touch Call Assembly or DACC

Source Record Identification : "<CORE>::Trunk_Group = 575"
Related Record(s) Identification : "<CORE>::Trunk_Group = 576"
Matching Criteria : "<First_Record>::<CORE>::Calling_Number =
<Other_Record>::<CORE>::Calling_Number &&
"<First_Record>::<CORE>::Called_Number =
<Other_Record>::<CORE>::Called_Number"
Assembly Topology : "One To One"
Assembly Criteria : No. of Records = 2
Threshold Time : Week
Purge Options : On Threshold Time
Reformat Definition : "<First_Record>::<CORE>::Call_Type =
<Other_Record>::<CORE>::Call_Type>"
Example 2: Lucent Multi Voice Call Assembly Source Record Identification : "<IPVF>::CallSessionStatus = Start"
Related Record(s) Identification : "<IPVF>::CallSessionStatus = Stop ||
<IPVF>::CallSessionStatus = InComplete"
Matching Criteria : "<First_Record>::<LMULTIVOIP_CDR>::Call_Identifier ==
<Related Record>::<IPCDR>::Call_Identifier"
Assembly Topology : "One To One"
Assembly Criteria : No. of Records = 2
Threshold Time : None
Purge Options : On Assembly Criteria
Reformat Definition : "<First_Record>::<IPVF>::Duration =
Other_Record>::<IPVF>::Duration>"
Example 3a: Cisco VOIP Call Assembly1

Source Record Identification : "<IPCDR>::CallLegType = 1"
Related Record(s) Identification : "<IPCDR>::CallLegType = 2"
Matching Criteria : "<Source Record>::<IPCDR>::ConnectionId == <Related
Record>::<IPCDR>::ConnectionId"
Assembly Topology : "One To One"
Assembly Criteria : No. of Records = 2
Threshold Time : None
Purge Options : On Assembly Criteria -continued Reformat Definition : "<Source Record>::<IPCORE>::Duration = <Other_Record>::<CORE>::Duration>"
Example 3b: Cisco VOIP Call Assembly2

Source Record Identification : "<CORE>::CallLegType = 3"
Related Record(s) Identification : "<IPCDR>::CallLegType = 4"
Matching Criteria : "<Source Record>::<IPCDR>::ConnectionId == <Related Record>::<IPCDR>::ConnectionId"
Assembly Topology : "One To One"
Assembly Criteria : No. of Records = 2
Threshold Time : None
Purge Options : On Assembly Criteria
Reformat Definition : "<Source Record>::<IPCORE>::Duration = <Other_Record>::<IPCORE>::Duration>"
Example 4: Lucent Data Services Source Record Identification : "<DS>::LinkingCode > 0 && <DS>::CallType = 059 && <DS>::StructureCode = X1330 || X1332 || X1333 || X1339"
Related Record(s) Identification : "<DS>::LinkingCode > 0 && <DS>::CallType = 059 && <DS>::StructureCode = X1118 || X1119"
Matching Criteria : "<Source Record>::<DS>::LinkingCode == <Related Record>::<DS>::LinkingCode"
Assembly Topology : "One To One"
Assembly Criteria : No. of Records = 2
Threshold Time : None
Purge Options : On Assembly Criteria
Reformat Definition : "<Source Record>::<CORE>::<Field> = <Other_Record>::<IPCORE>::<Field>"
Example 4a: Ericsson Call Forwarding Source Record Identification : "<BaseRecord>::CallFeatures = CALL_FORWARD"
Related Record(s) Identification : "<RelatedRecord>::CallFeatures = CALL_FORWARD && OtherRecord::ReroutingIndicator != 0 && Related Record::SSI == 03 || 04 || 05 || 09 || 12 || 13"
Matching Criteria : "<Source Record>::<DS>::CallId == <Related Record>::<DS>::CallId && (Source Record::BSubscriberMSNo == OtherRecord::ASubcriberMSNo) != 1"
Assembly Topology : "One To Many"
Assembly Criteria : On Threshold Time
Threshold Time : None
Purge Options : On Threshold Time
Reformat Definition :
For L – M – L,
{
   //Prepare 1 APV output object
   aCore -> Mobile Role = Originating Mobile – Land;
   aCore -> Asubscriber Number = Asubscriber Number of child record
   aCore -> Bsubscriber Number = Bsubscriber Number of child record
   aCore -> CallFeatures    = 1 // For all CF cases
                            = 8192 // For CF with transfer on no reply
                            = 9 // For CF + CD (if M is roaming
}
For M1 – M2 – L,
{
   // Prepare 2 APV output objects aCore1 and aCore2
   aCore1 -> Mobile Role = Originating Mobile – Mobile
   aCore1 -> Asubscriber Number = Asubscriber Number of Base record
   aCore1 -> Bsubscriber Number = Bsubscriber Number of Base record
   aCore1 -> CallFeatures = 0
   acore2 -> Mobile Role = Originating Mobile – Land
   aCore2 -> Asubscriber Number = acore1->Bsubscribernumber
   aCore2 -> Bsubscriber Number = Bsubscriber Number of child record
   aCore2 -> CallFeatures    = 1 // For all CF cases
                             = 8192 // For CF with transfer on no reply
                             = 9 // CF + CD If M2 is roaming
}

-continued

```
For L – M1 – M2,
{
// Prepare 2 APV output objects aCore1 and aCore2
    aCore1 -> Mobile Role = Terminating Land – Mobile
    aCore1 -> Asubscriber Number = Asubscriber Number of Base record
    aCore1 -> Bsubscriber Number = Bsubscriber Number of Base record
    aCore1 -> CallFeatures = 0
    acore2 -> Mobile Role = Originating Mobile – Mobile
    aCore2 -> Asubscriber Number = acore1->Bsubscribernumber
    aCore2 -> Bsubscriber Number = Bsubscriber Number of child record
    aCore2 -> CallFeatures    = 1 // For all CF cases
                              = 8192 // For CF with transfer on no reply
                              = 9 // CF + CD if M1 is roaming
}
For M1 – M2 – M3,
{
    //Prepare 3 APV output objects aCore1, aCore2 and aCore3
    aCore1 -> Mobile Role = Originating Mobile – Mobile
    aCore1 -> Asubscriber Number = Asubscriber Number of Base record
    aCore1 -> Bsubscriber Number = Bsubscriber Number of Base record
    aCore1 -> CallFeatures = 0
    acore2 -> Mobile Role = Originating Mobile – Mobile
    aCore2 -> Asubscriber Number = acore1->Bsubscribernumber
    aCore2 -> Bsubscriber Number = Bsubscriber Number of child1 record
    aCore2 -> CallFeatures    = 1 or 8192
                              = 9 (CF + CD if M2 is roaming)
    aCore3 -> Mobile Role = Terminating Mobile – Mobile
    aCore3 -> Asubscriber Number = acore2->ASubscribernumber
    aCore3 -> Bsubscriber Number = Bsubscriber Number of child2 record
    aCore3 -> CallFeatures = 0.
}
Example 4a: Ericsson Long Duration Calls Source Record Identification : "FirstRecord::switch calltype == L–L || L–M || M–L || M–
M) && FirstRecord::CauseCode == 1 || 2 || 6"
Related Record(s) Identification    : OtherRecord::switch calltype == L–L || L–M || M–
L || M–M) && FirstRecord::CauseCode == 1 || 2 || 6"
Matching Criteria       : "<FormerRecord>::CallId ==
<CurrentRecord>::RelatedCallId
Assembly Topology    : "One To Many"
Threshold Time       : Depending on some rule?? Checkout..
Assembly Criteria    : On Threshold Time
Purge Options : On Threshold Time
Reformat Definition :
Example 5 - GPRS Call Assembly Source Record Identification : AssembleyCriteria enabled from the GUI
                                        And <GPRS>::<CauseForTermination> ==
0
Related Record(s) Identification    : AssembleyCriteria enabled from the GUI
                                        And <GPRS>::<CauseForTermination>
either(16,17,18,19)
Matching Criteria       : "<First_Record>::<GPRS>::ChargingID =
<Other_Record>::<GPRS>:ChargingID
Assembly Topology   : Many APVs to One
Assembly Criteria   : OnThresholdTime
Threshold Time      : Some Minutes - to be checked again
Purge Options: None All Records has to be assembled once the threshold time is up.
Reformat Definition   : As in the following SCRIPt
```

In the illustrative embodiment, at the point where the assembly script is made run: (1) The Source/Main GPRS record is identified; (2) All the Partial Records in the Database are retrieved using the matching criteria; (3) Irrespective of the type of the record (either partial or main), this record is sent one at a time to the script; (4) The scripts are receives in MDU form in the existing RC scripts; and (5) All of the partial and the main records are stored in a certain container and for each record in the container the script is called.

The APV writer 88 takes the assembled APV records 122 and writes them into an output APV file 132 in accordance with the apv.def metadata 88. The APV writer 88 has flow controls such as volume based/time based. That is if the output APV records exceeds a threshold value, then the APV Writer can close a given output APV file 132 and open another output APV file 132 for the same assembled APV record 122. The APV dispatcher 84 receives the output APV file 132 and sends a dispatch message 134 to Procom 62 via a comserver for further distribution processing.

Collection Processing Flow

Returning to FIG. 2, the NEASL Scripts 70 are used to convert usage data 16 to collected data 60. In particular, the conversion processing flow of the Flex NE interface 50 is performed in turn by a parser 80, a Call Detail Record (CDR) validator 82, an APV formatter 84, an assembler 86, an APV writer 88, and a dispatcher 90. Each stage 80-90 of the Flex NE interface 50 is configured by using the NE ASL scripts 70 and by accessing interactively configured definitions for the format of the received data 48, depicted as "ne.def" metadata 92, and an APV definition for an assembled APV record, depicted as "apv.def" metadata 94. The definition files ne.def metadata 92 and apv.def metadata 94 are both stored in a real-time processing manager (RPM) database 96.

The ne.def metadata 92 includes an NE definitions superclass 98 having an aggregation association with file definition 100, which further has an aggregation association with record definition 102, which in turn has an aggregation association with field definition 104.

The parser 80 parses and stores the received data 48 into the format that is specified for the given NE 18 in the ne.def metadata 92. In addition, the parser 80 converts the raw received data 48 into an ASCII format that may be viewed via the GUI definition windows 56. The parser 80 also identifies received data 48 that cannot be decoded/parsed for processing by an error manager.

The parser 80 is configured by the plurality of adapters 54, which may include a bundled adapter 106 that was included with the Flex NE interface 50, a downloaded adapter 108 which is received after installation of the Flex NE interface 50, and an interactively defined adapter 110 produced via the GUI definition window 68, depicted as mapping windows 112 and mapping association windows 114. The parser 80 produces thereby a parsed ASCII switched record 116 to the CDR validator 82.

For a given NE 18, a user specifies the required validation rules for all CDR types via GUI using NEASL scripts 70. The CDR validator 82 checks the CDR against those specified validation rules, created with the CDR filter scripts 74. If validation succeeds, then the CDR becomes a validated switch record 118 that is further processed. If validation fails, those CDRs is processed by the error manager.

Once a call detail record (CDR) is decoded and validated, APV formatter 84 converts the validated switch record 118 into an APV record 120 in accordance with the associated CDR to APV mapping rules defined in the apv.def metadata 94, created with the APV field mapping scripts 76. With the usage data 16 now in the standardized format of the APV record 120, collection is complete and distribution processing begins.

The assembler 86 correlates and aggregates the APV records 120 into assembled APV records 122 as described in more detail in the aforementioned co-pending application entitled "Flexible Network Element Interface" by Swarna et al. Basically, the assembler 86, in conjunction with the correlation/aggregation tool 58, identifies an assembly related record either by one field or group of fields in the record. Thereafter, two related records are assembled through matching criteria such as checking for one field or checking for multiple fields with multiple expressions. Then, an assembly process involves populating information from one record into another record or creating a new record by populating the information from all of the unassembled APV records 120. Various assembly topologies of assembled APV records 122 are created. One record can be assembled with exactly one record to produce one assembled record. One record can be assembled with many other records within a network element to produce one assembled record. One record can be assembled with many other records within a network element to produce many assembled records. This correlation/aggregation by the assembler 86 is further performed interactively with a user through the GUI definition windows 68, such as assembly definition windows 124 and assembly association windows 126.

Specifically, the assembly definition and association windows 124, 126 define first record identification, other record(s) identification, matching criteria, assembly criteria, assembly topology that are stored in an assembly configuration database 128 as an assembly specification, assembly criteria, source and related records definition, and matching criteria. The unassembled APV records 120 are temporarily stored and manipulated in an assembly pool database 130, which like the assembly configuration database 128, is part of the correlation/aggregation tool 58. Management of the assembly pool database further includes reporting on unmatched APV records 120, reconciliation of assembled APV records 122, and purging of the assembly pool database 130.

Data structures in the NE_ASSLY_ATTRIBUTES table stores the detail description of the assembly type. Each type of assembly differs by the assembly criteria type. This makes the assembly as volume based, time based or expression based. The fields of the NE_ASSLY_ATTRIBUTES table include An ASSLY_ID field is of type Number(5) and it gives the Assembly ID, the primary key. A NAME field is of type-Varchar2(20) and is the Assembly Name A RESP_USER field is of type Varchar2(8). An MDU_TYPE field is of typeNumber(5). A DATE_TIME field is of typeDate. A NOTES field is of typevarchar2(200). An ASSLY_TOPOLOGY field is of typeNumber(1). An ASSLY_CRITERIA_TYPE field is of typeNumber(1). An ASSLY_CRITERIA_VALUE field is of typeNumber(10). A PURGE_OPTION field is of typeChar(1). A PURGE_THRESHOLD_TYPE field is of typeNumber(10). A TIME_LIMIT_TYPE field is of typeNumber(1). An ERROR_ACTION field is of typeNumber(1).

An NE_ASSLYPOOL table is responsible for storing the assembly related records that are yet to be matched. The primary key is the APV_record. The NE_AsslyPool Table includes the following fields: An NE NAME field is of type Varchar2 and is the name of the collection point. ASSLY_NAME field is of type Varchar2 is a foreign fey from NE_ASSLYCONFIG table. An INPUT_FILENAME field is of type Varchar2 and is the input or the CDR filename. An APV_RECORD field is of type Varchar2 and is the APV record to be matched with a corresponding Record(s). A RECORD_NO field is of type Number and is the APV record number. A RECORD_TYPE field is of type Number(1) and denotes either source record or related record. A MATCH-FLAG field is of type Number(1) denotes whether matched or unmatched. (In the case of VT/DACC, the Administrative Records are matched with a related record but are not removed until the threshold is exceeded.) All the records with unmatched flag are moved to the NE_UNMATCHED table by the purging script run on a periodic basis. A CREATE_DATETIME field is of type date and is the time when the APV record is inserted into the database. Is used by the purging script. An APV_TYPE field is of type Varchar(2) and specifies the APV type.

An Ne_Assly_Unmatched table is responsible for storing the assembly related records that are not matched and exceeded the threshold time. The primary key is the APV_record. The fields of this table are as follows: A NE_NAME field of type Varchar2 that is the name of the collection point. An ASSLY_NAME is of type Varchar2 and contains the name for this particular assembly configuration. An INPUT_FILENAME field is of type Varchar2 and contains the input or the CDR filename. An APV_RECORD is of type Varchar2 and is the unmatched APV record. A RECORD_TYPE field is of type Number(1) and denotes either Source Record or Related Record. A CREATE_DATETIME field is of type Date and contains the time when the APV record is inserted into the database An NE_ASSLY_ASSOCIATION table gives the details on the association of an assembly to the collection point. In the association of assembly to the collection point, same assemblies may be associated to many collection points. The NE_Assly_Association table includes the following fields: ASSLY_ID which is of type Number(5) and is the assembly configuration ID; Assly_Role field which is of type Number91) and denotes either source or related collection point; and an NE_Name field which is of type Varchar2(24) and is the name of the NE that is to be associated.

The APV writer 88 takes the assembled APV records 122 and writes them into an output APV file 132 in accordance with the apv.def metadata 88. The APV writer 88 has flow controls such as volume based/time based. That is if the output APV records exceeds a threshold value, then the APV Writer can close a given output APV file 132 and open another output APV file 132 for the same assembled APV record 122. The APV dispatcher 84 receives the output APV file 132 and sends a dispatch message 134 to Procom 62 via a comserver for further distribution processing.

Flexible Network Element Framework

Figure 3:
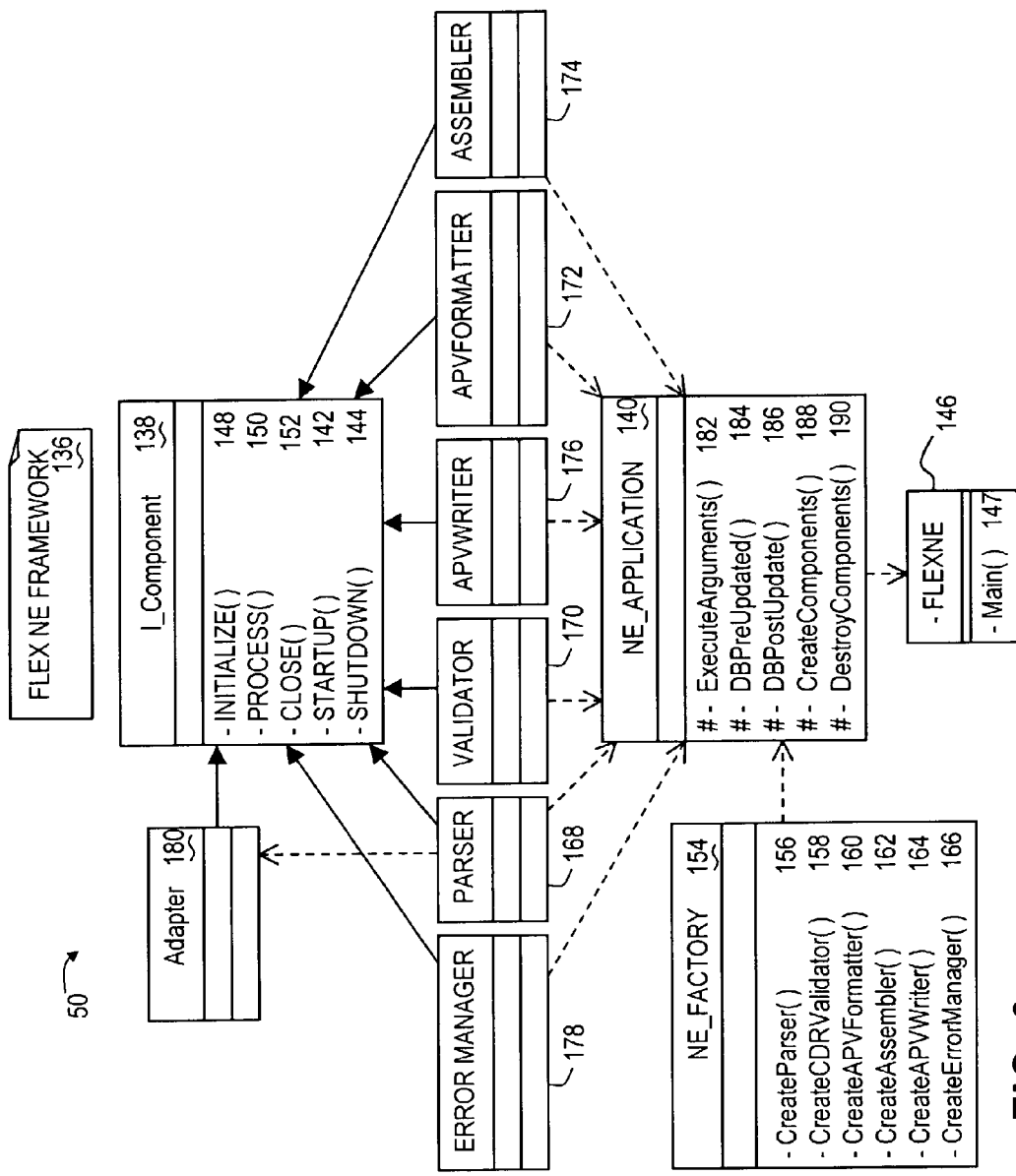
FIG. 3 is an object-oriented programming (OOP) class diagram for a Flex NE framework implementing the Flex NE Interface of FIG. 2.

FIG. 3 depicts an illustrative Object Oriented Programming (OOP) class diagram, depicted as Flex NE framework 136, of the Flex NE interface 50 of FIGS. 1 and 2. An I_Component utility 138 contains the basic sequence performed each time received usage data 48 is to be processed. An "NE_Application" class 140 is the controller class for the framework 136. Public startup and shutdown methods 142, 144 are called when bringing up and shutting down a Flex NE instance 146, which has a private Main method 147. Public initialize, process and close methods 148, 150, 152 are invoked for each of the messages received from a File Collector through a CommServer.

It will be appreciated that to a large extent the text name for the data members and functions are herein purposefully chosen to be descriptive. Thus, absent specific description, one of ordinary skill in the art will understand the role of each data member and function given its context and descriptive name.

An NE Factory utility 154 includes public methods CreateParser( ); CreateCDRValidator( ); CreateAPVFormatter( ); CreateAssembler( ); CreateAPVWriter( ); CreateErrorManager( ) 156-166, which create respectively components Parser, Validator, APVFormatter, Assembler, APVWriter, and ErrorManager 168-178. The Parser is created as dictated by component Adapter 180. The controller class NE_Application 140 includes protected methods ExecuteArguments( ), DBPreUpdated( ), DBPostUpdate( ), CreateComponents( ), and DestroyComponents( ) 182-190.

Figure 4:
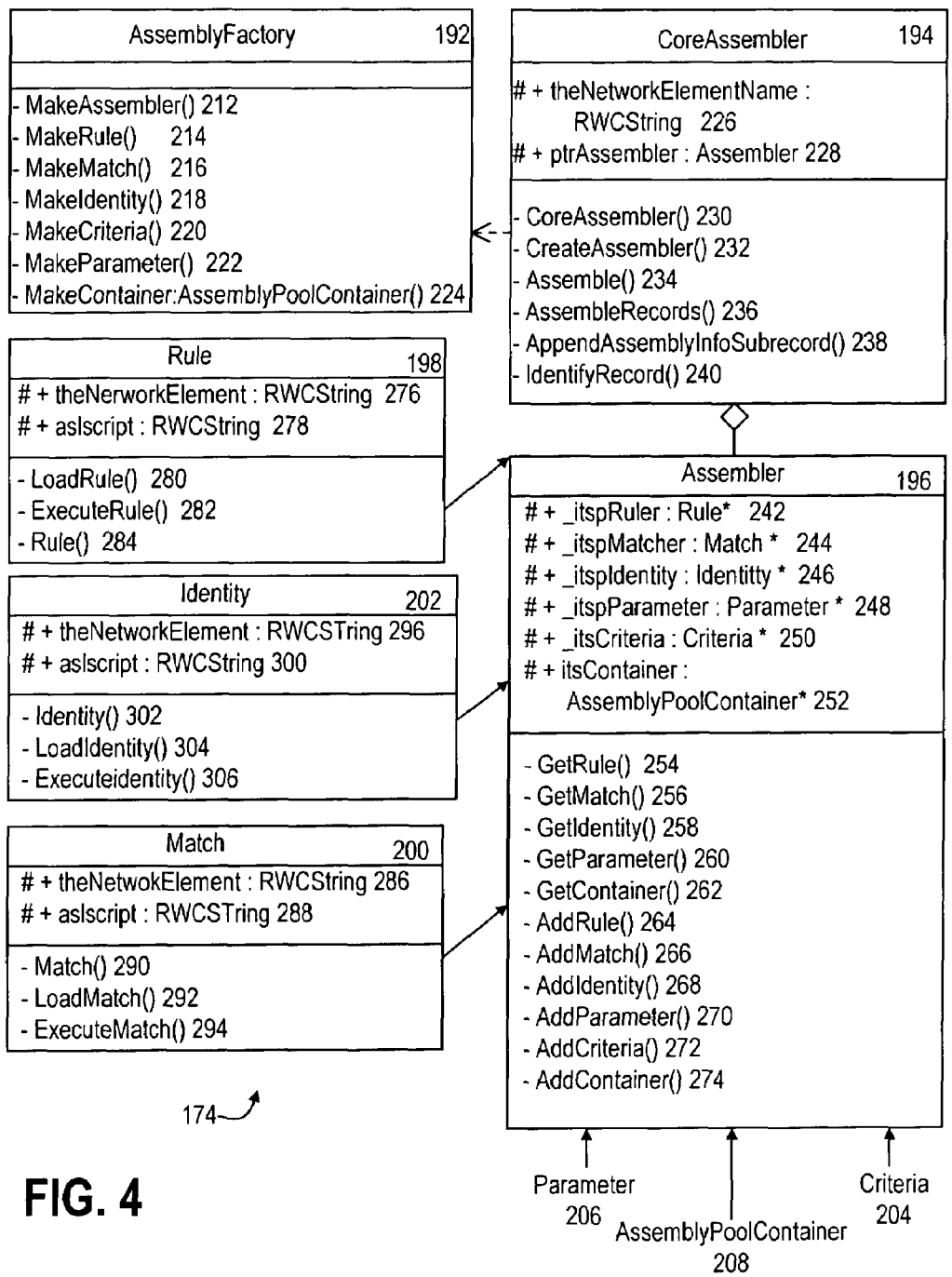
FIG. 4 is an OOP class diagram for the Assembler utility of the framework of FIG. 3.
Figure 5:
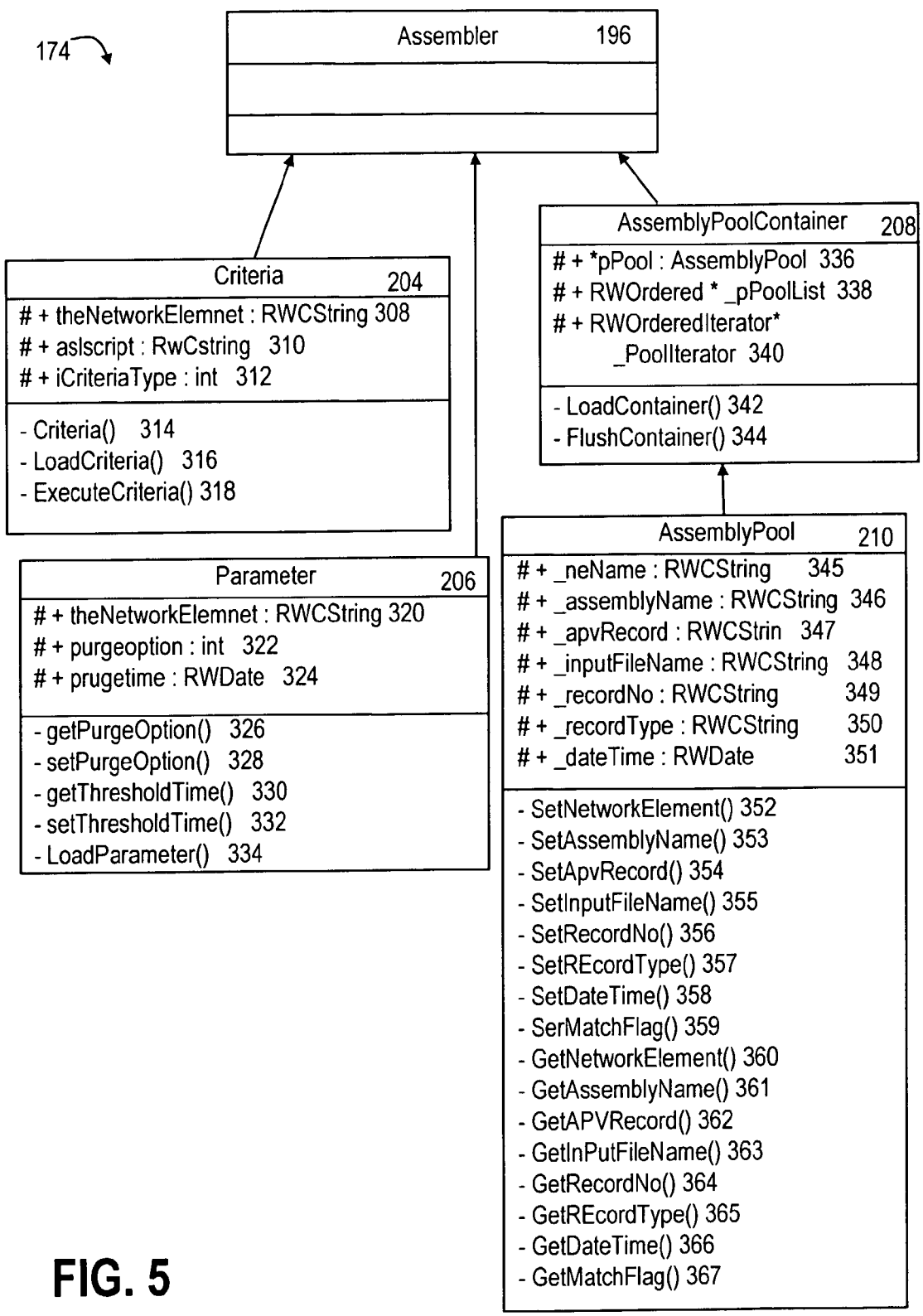
FIG. 5 is an OOP class diagram for the Assembler Pool Container utility of the Assembler utility of FIG. 4.

FIGS. 4-5 depict a class structure for the correlation/aggregation tool 58 of FIG. 2. In particular, a class AssemblyFactory 192 creates components for a CoreAssembler class 194, which contains the core functionality. Specifically, an Assembler class 196, an assembly class of the CoreAssembler class 194, loads the appropriate parameters for the components created by the AssemblyFactory class 192, that is, components rule 198, match 200, identify 202, criteria 204, and parameter 206 for the Assembler 174. The Rule, Match, Identity, Criteria, and Parameter classes 198-206 are responsible for loading the script from an NE_ASLCODE table (not shown) and translating the script. Records that are to be assembled or that have been assembled are stored in an AssemblyPoolContainer class 208, which is further derived from AssemblyPool class 210. The AssemblyPool class 210 contains the fields of the DB table NE_ASSLYPOOL table, which contains those records that are assembly candidates that are yet to be matched and assembled. This class also contains the fields of the DB table NE_ASSLYATTRIBUTES, which are assembly candidates and do not have matching record(s).

In the case of any custom assembly, the AssemblyFactory class 192 may be derived from to create a xxxAssemblyFactory with the methods overridden. For example, MakeRule might create a xxxRule derived from the Rule class or the default Rule class. This might be useful if we do not want to have the default behavior, in this case of loading the components from the database.

The external interface to the component assembler is through the public methods: Startup, Initialize and Process. The Startup method loads all the NEASL rules and also fetches the ASSLYID for the current collection point through the NE_ASSLY_ASSOCIATION table.

The NE_ASSLY_POOL has the partial records. The Partial records are loaded into the memory for each dataset and are flushed back into the pool at the end of processing each file. The method LoadContainer( ) and Flush Container does this. Flushing back of partial records and loading at the start of each file processing enables assembly across collection point. The assembling of records that come from different collection point is done through the function InitialAssembley( ). The records that come into the system are first identified as either source or related. This functionality is implemented in the function IdentifyRecords( ). The function GetMatchedRecords( )collects the matched records using the matching criteria specified through the ASL script. The Assembly Criteria is an important factor, which specifies the point at which the records needs to be assembled: volume-based assembly, time-based assembly, expression-based assembly. The functions like CheckBasedonVolume, CheckBasedonTime, and CheckBasedonExpression take care of the above criteria.

For enabling backtracking and to make the assembly process transparent to the user, an assembly subrecord is appended to the APV record. This is similar in nature to the client specific subrecord and is of the format:
"<ASSLY_INFO>,InputFilename1,RecordNumber %% InputFilename2, RecordNumber . . . "

The assembly subrecord contains information about the input usage file and the CDR record number of the Records that are assembled to get a single APV. In addition, prior to the assembly process, the to-be-assembled APVs are written to a flat file in a log directory.

The assembly is configured via GUI using NEASL with various key parameters, such as Source Record Identification, Related Record(s) Identification, Matching Criteria, Assembly Criteria, Assembly Topology, Threshold Time, Purge Options, and Reformat Definition.

As for the specific class, data and function structure depicted, The AssemblyFactory class 192 includes functions MakeAssembler( ) 212, MakeRule( ) 214, MakeMatch( ) 216, MakeIdentity( ) 218, MakeCriteria( ) 220, MakeParameter( ) 222, and MakeContainer:AssemblyPoolContainer( ) 224.

The CoreAssembler class 194 includes data members theNetworkElementName: RWCString 226 and ptrAssembler: Assembler 228 and includes functions CoreAssembler( ) 230, CreateAssembler( ) 232, Assemble( ) 234, AssembleRecords( ) 236, AppendAssemblyInfoSubrecord( ) 238, and IdentifyRecord( ) 240

The Assembler class 196 includes data members _itspRuler: Rule*242, _itspMatcher: Match*244, _itspIdentity: Identitty*246, _itspParameter: Parameter*248, _itsCriteria: Criteria*250, and itsContainer: AssemblyPoolContainer*252. The Assembler class 196 also includes functions GetRule( )254, GetMatch( )256, GetIdentity( ) 258, GetParameter( ) 260, GetContainer( ) 262, AddRule( ) 264, AddMatch( ) 266, AddIdentity( ) 268, AddParameter( ) 270, AddCriteria( ) 272, and AddContainer( ) 274.

The Rule class 198 includes data members theNetworkElement: RWCString 276 and aslscript: RWCString 278, and functions LoadRule( ) 280, ExecuteRule( ) 282, and Rule( ) 284.

The Match class 200 includes data members theNetwokElement: RWCString 286 and aslscript: RWCSTring 288, and functions Match( ) 290, LoadMatch( ) 292, and ExecuteMatch( ) 294.

The Identity class 202 includes data members theNetworkElement: RWCSTring 296 and aslscript: RWCString 300, and functions Identity( ) 302, LoadIdentity( ) 304, and Executeidentity( ) 306.

The Criteria class 204 includes the data members theNetworkElemnet: RWCString 308, aslscript: RwCstring 310, and iCriteriaType: int 312. The Identity class 202 also includes functions Criteria( ) 314, LoadCriteria( ) 316, and ExecuteCriteria( ) 318.

The Parameter class 206 includes data members theNetworkElenmet: RWCString 320, purgeoption: int 322, and prugetime: RWDate 324. The Parameter class 206 also includes functions getPurgeOption( ) 326, setPurgeOption( ) 328, getThresholdTime( ) 330, setThresholdTime( ) 332, and LoadParameter( ) 334.

The AssemblyPoolContainer class 208 includes data members *pPool: AssemblyPool 336, RWOrdered*_pPoolList 338, and RWOrderedIterator*_PoolIterator 340. The AssemblyPoolContainer 208 also includes functions LoadContainer( ) 342 and FlushContainer( ) 344.

The AssemblyPool class 210 includes data members _neName: RWCString 345, _assemblyName: RWCString 346, _apvRecord: RWCStrin 347, _inputFileName: RWCString 348, _recordNo: RWCString 349, _recordType RWCString 350, and _dateTime: RWDate 351. The AssemblyPool class also includes functions SetNetworkElement( ) 352, SetAssemblyName( ) 353, SetApvRecord( ) 354, SetInputFileName( ) 355, SetRecordNo( ) 356, SetREcordType( ) 357, SetDateTime( ) 358, SerMatchFlag( ) 359, GetNetworkElement( ) 360, GetAssemblyName( ) 361, GetAPVRecord( ) 362, GetInPutFileName( ) 363, GetRecordNo( ) 364, GetREcordType( ) 365, GetDateTime( ) 366, and GetMatchFlag( ) 367.

Sequence of Collection of Usage Data

Figure 6:
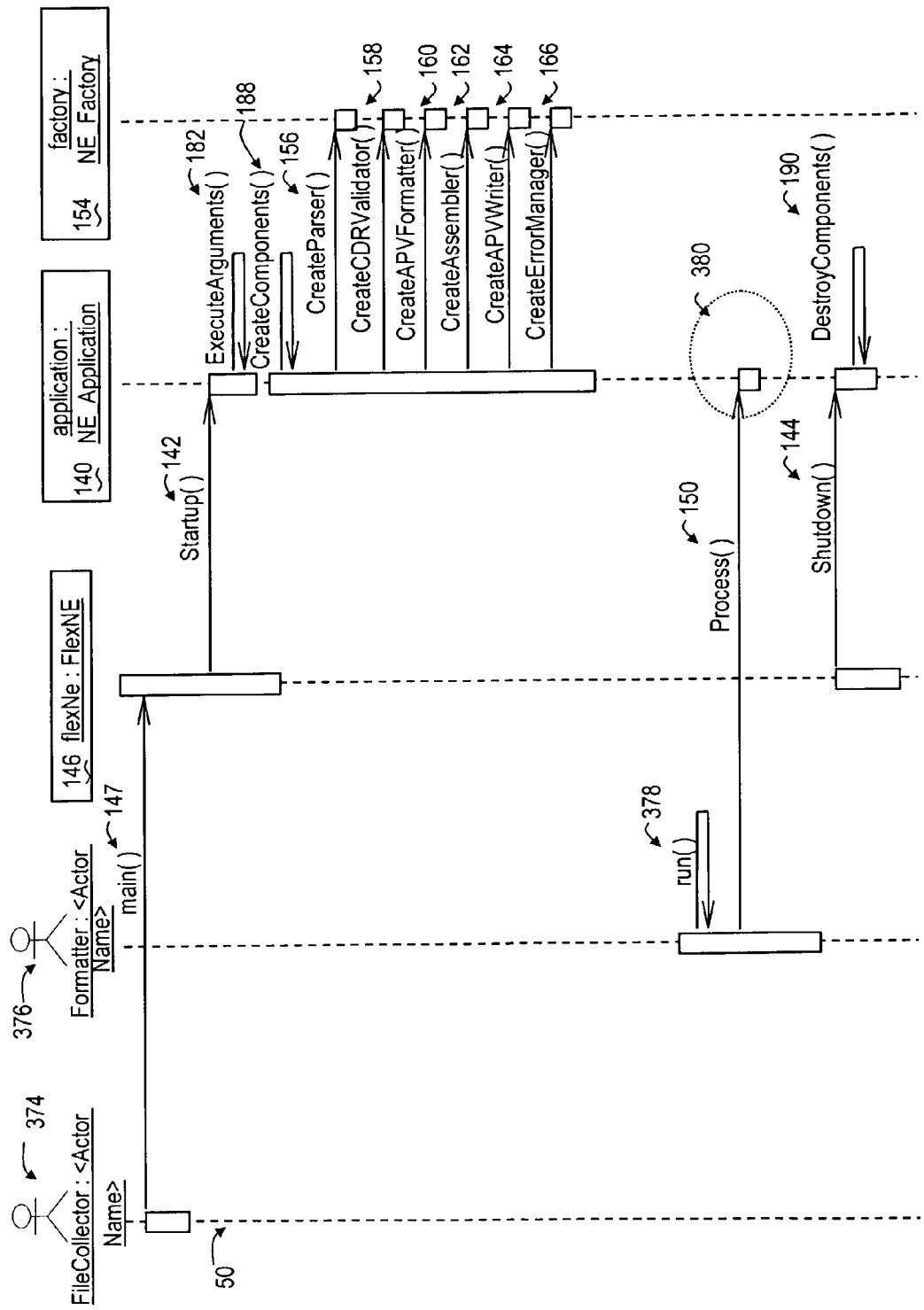
FIG. 6 is a sequence diagram of the Flex NE framework of FIG. 3.
Figure 7:
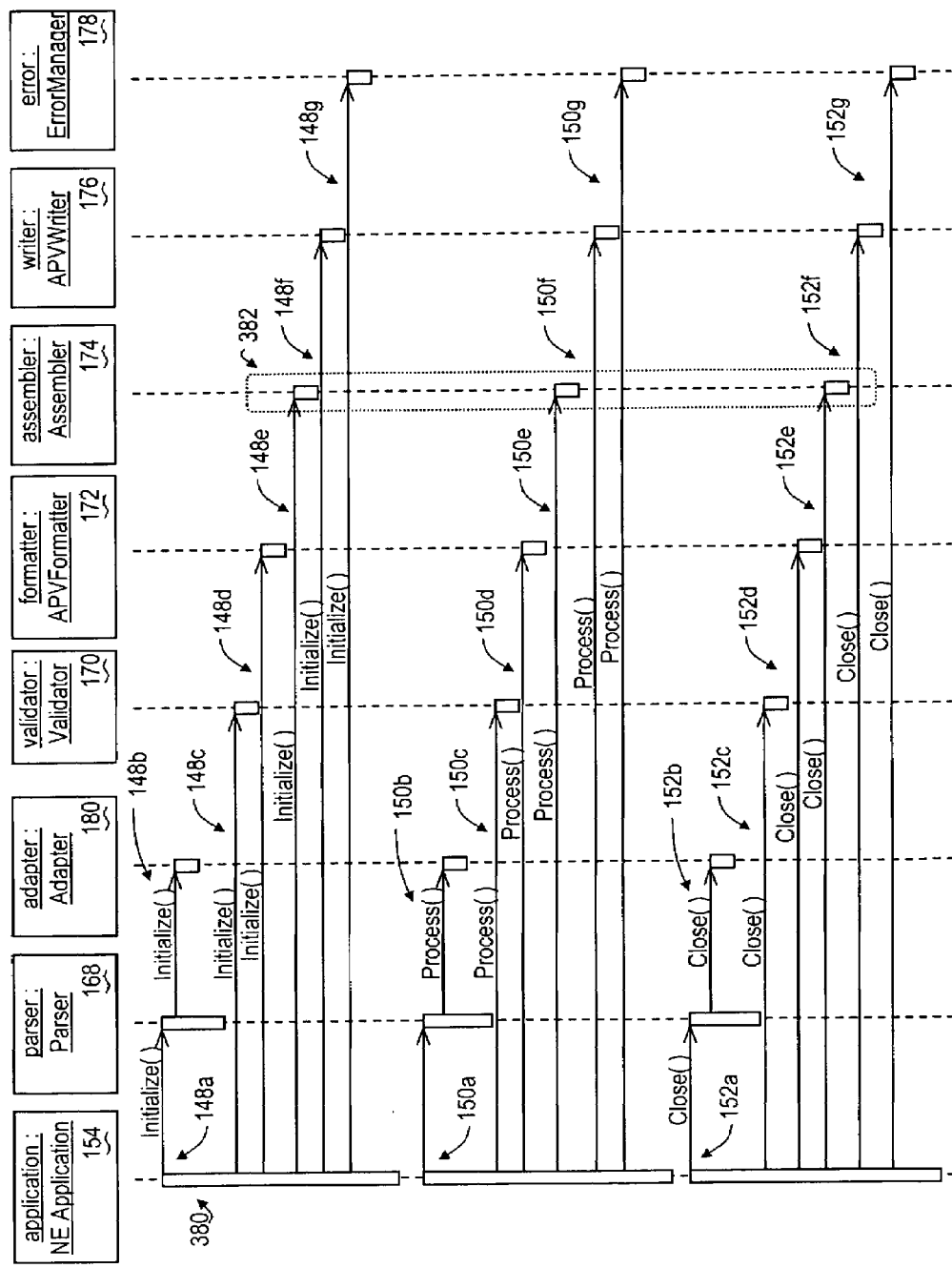
FIG. 7 is a sequence diagram of the Flex NE application of the framework of FIG. 6.
Figure 8:
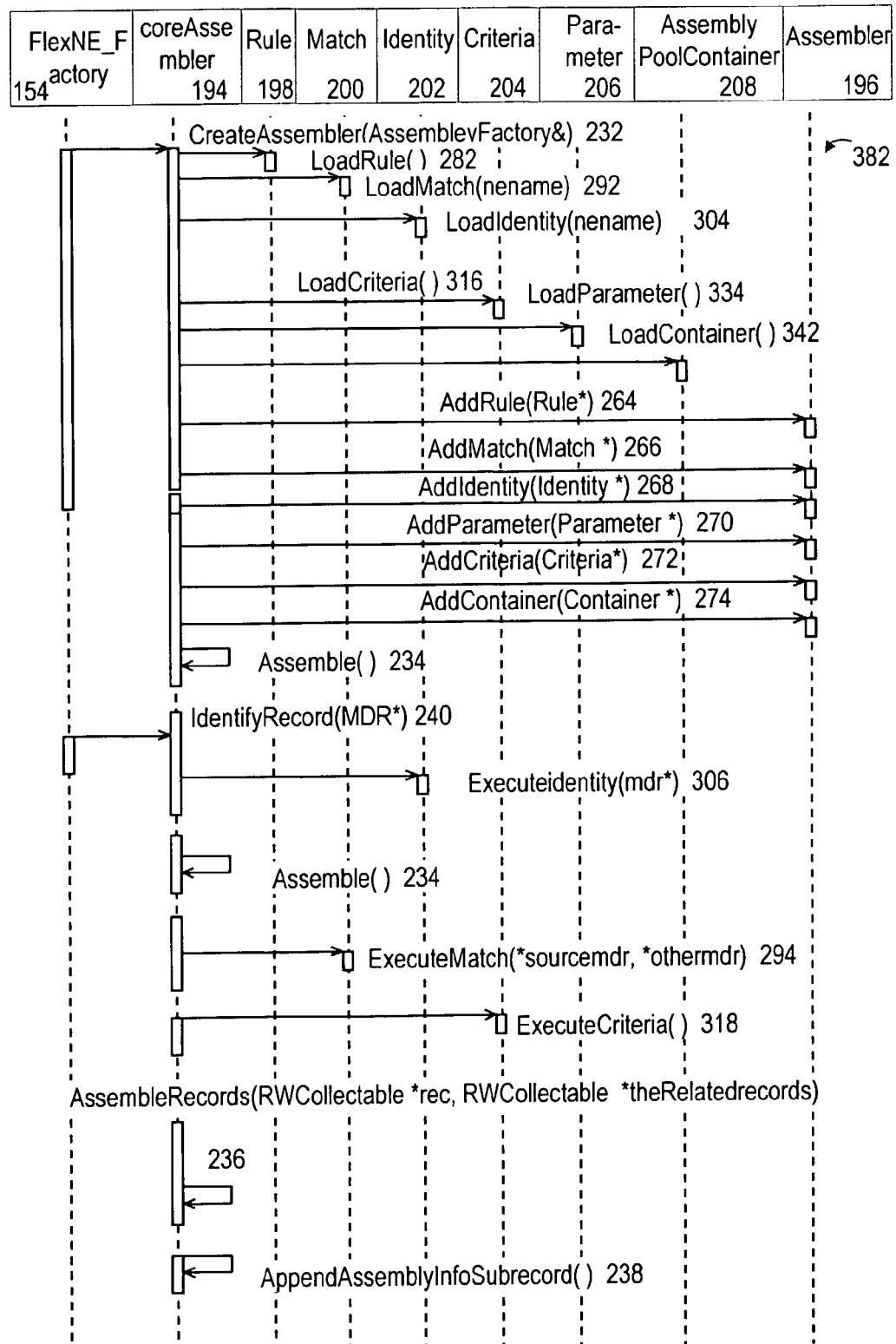
FIG. 8 is a sequence diagram for the Assembler component of the Flex NE application of FIG. 7.
Figure 9:
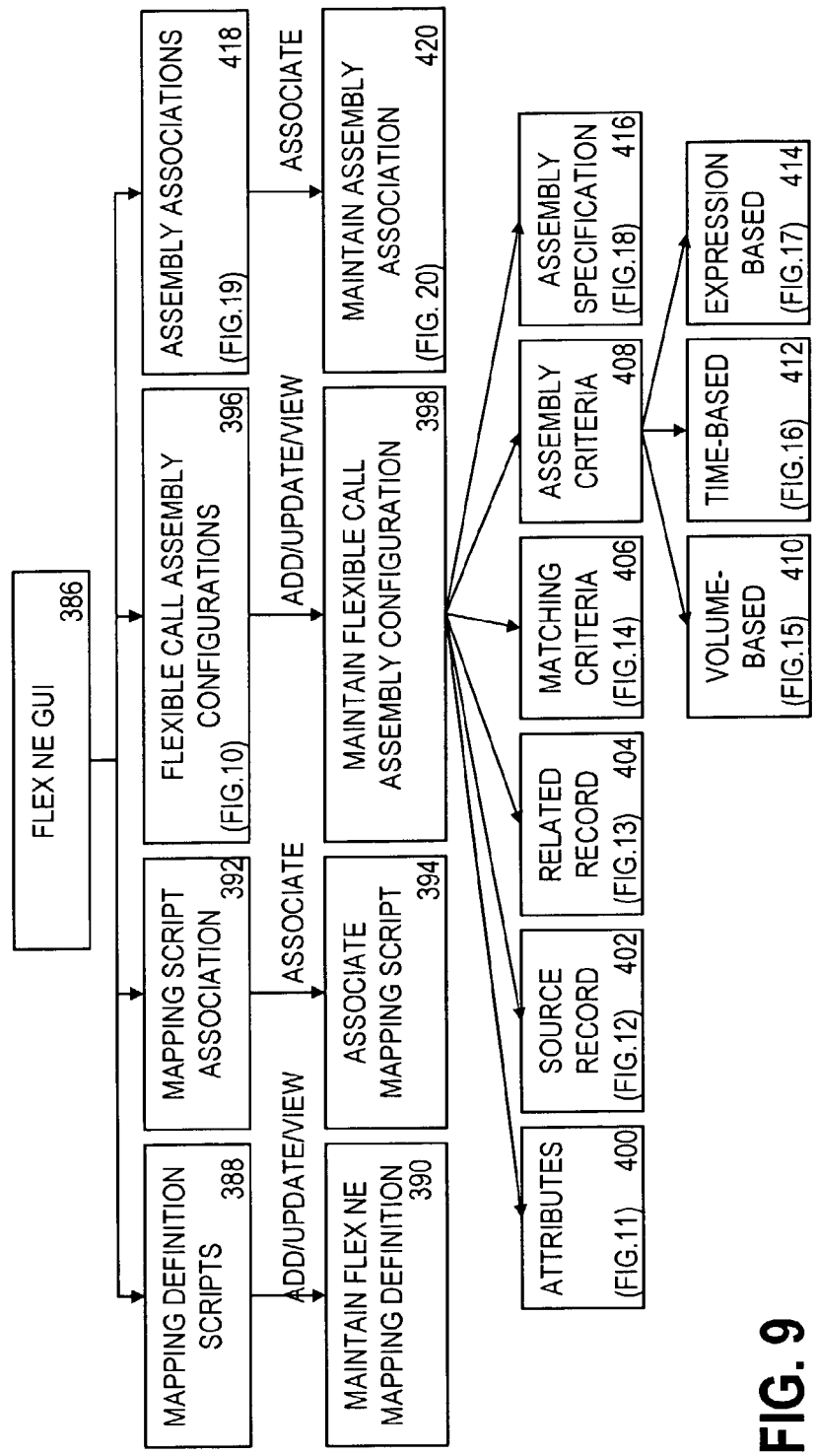
FIG. 9 is a hierarchical depiction of the Flex NE GUI for the Flex NE Interface of FIG. 2.
Figure 12:
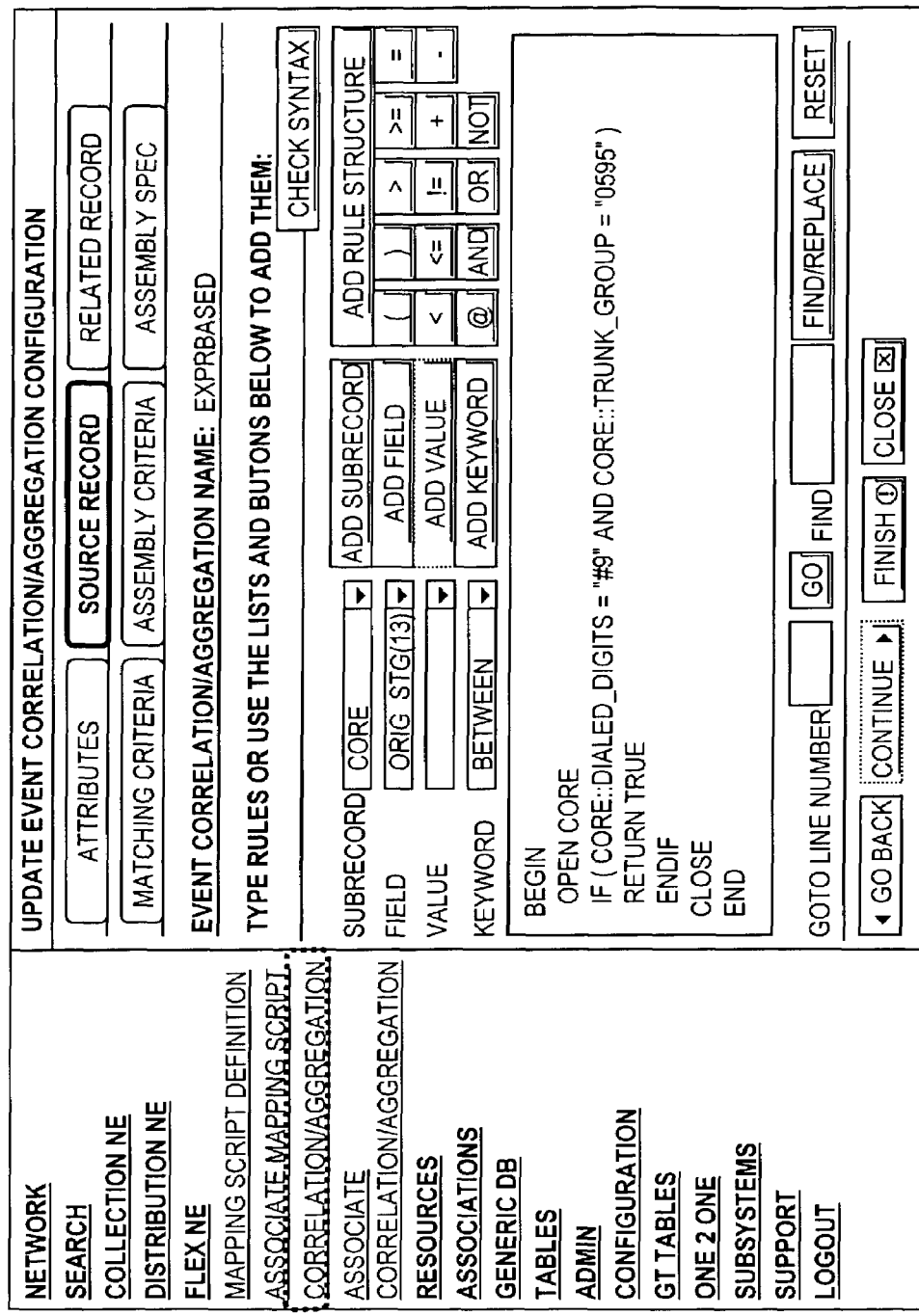
FIG. 12 is a source record window of the maintain flexible call assembly configuration GUI referenced in the Flex NE GUI of FIG. 9.
Figure 14:
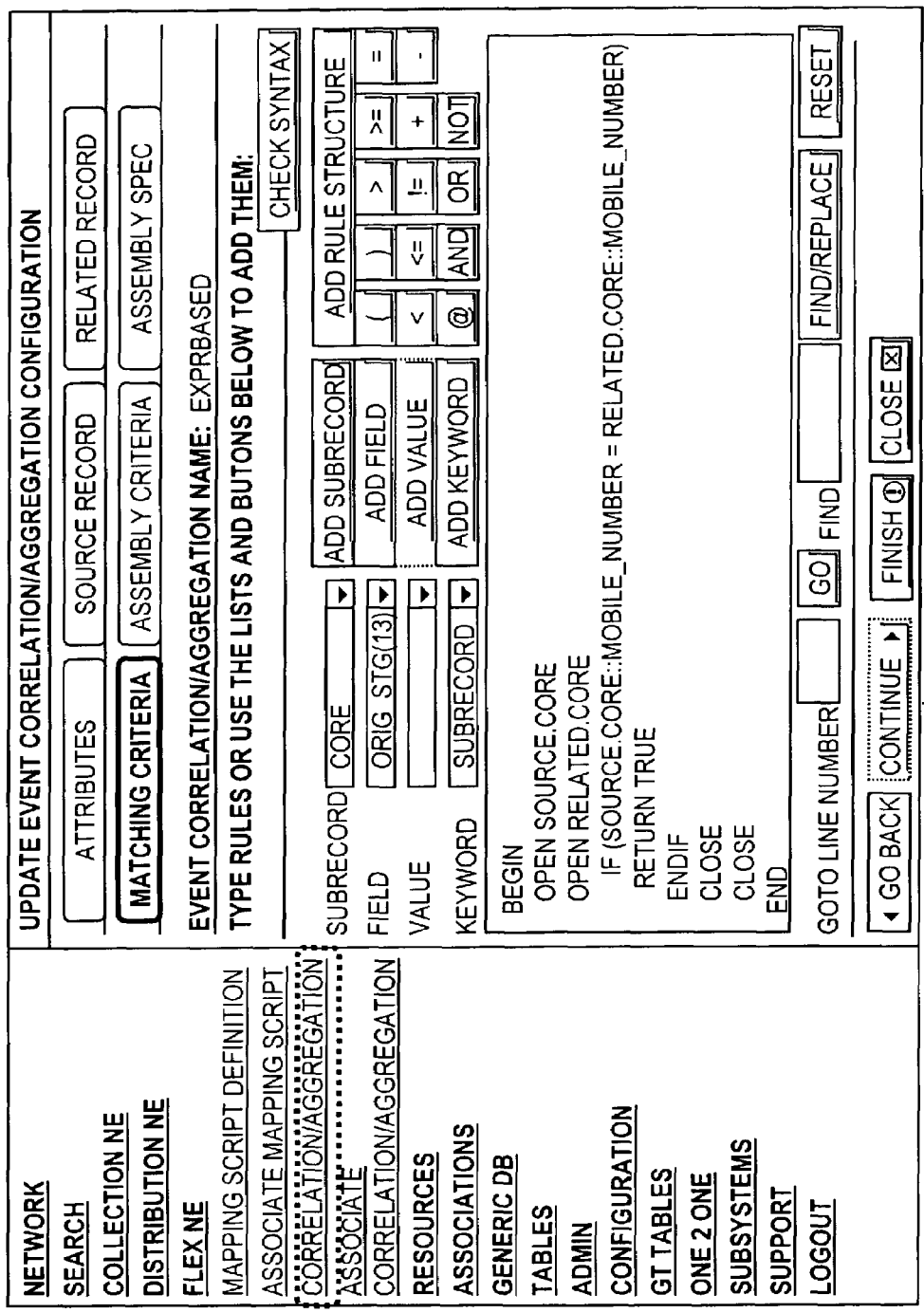
FIG. 14 is a matching criteria window of the maintain flexible call assembly configuration GUI referenced in the Flex NE GUI of FIG. 9.

FIGS. 6-8 depict sequences performed by the Flex NE Interface 50 of FIG. 1. In FIG. 6, a "FileCollector" actor 374 and "Formatter" actor 376 perform the function of the protocol handler/file collector 46 of FIG. 1. When FileCollector actor 370 receives data 48 from an NE 18 at processing block 370, main( ) method 147 of FlexNE class 146 is performed so that Startup( ) method 142 of I_Component class 138 is performed. In particular, ExecuteArgument( ) function 182 is used to initialize attributes passed as input parameters to the main method. Then, CreateComponents( ) is used to instantiate NE Factory class 154, and NE_Application class 140. Thereafter CreateParser( ); CreateCDRValidator( ); CreateAPVFormatter( ); CreateAssembler( ); CreateAPVWriter( ); CreateErrorManager( ) methods 156-166 are used to create respectively components 168-180. With the FileCollector actor 370 have setup the Flex NE Interface 50, then the Formatter actor 376 performs a run function 378 to begin the process of convening call data into mediation data. In particular, the process method 150 of the I_Component class 138 invokes the NE_application 154 to perform the conversion, depicted as 380 and described in more detail in FIG. 7. With the conversion complete, the Shutdown( ) 144 method of Flex NE class 146 invokes the DestroyComponents( ) method 190 of the NE_Application class 140.

FIG. 7 depicts the sequence 380 of operations performed by the NE_Application class 154 referenced in FIG. 6. The NE_Application class 154 invokes the Initialize function multiple time, depicted as 148a-148g to respectively initialize components 168-178. Then, the NE_Application class 154 invokes the Process function multiple time, depicted as 150a-150g to respectively sequentially process the received data with the initialized components 168-178. Thereafter, the NE_Application class 154 invokes the Close function multiple time, depicted as 152a-152g to respectively close components 168-178. The interaction between the NE_Application 154 and the Assembler 174 of functions 148e, 150e and 152e is designated at 382 and depicted in more in FIG. 8.

FIG. 8 depicts the sequence 382 of operations performed by the NE_Application 154 and the Assembler 174. The FlexNE_Factory 154 initializes the process with the CreateAssembler method 232. Thereafter, the interactively configured correlation and aggregation settings are loaded by methods LoadRule 282, LoadMatch 292, LoadIdentity 304, LoadCriteria 316, LoadParameter 334 and LoadContainer 274. This information is then encapsulated by the Assembler 196.

Flexible Network Element Graphical User Interface

With Reference to FIGS. 9-20, an illustrative Flex NE graphical user interface (GUI) 386 performs the functions of the NE Definition GUI 56 referenced in FIG. 1. A mapping definition scripts window 388 allows searching for and selecting a pre-existing NE mapping script for copying, viewing or updating. Once one of the pre-existing NE mapping scripts is selected, a maintain Flex NE mapping definition GUI 390 is opened, having an Attributes window for viewing and modifying the name for the mapping script definition and notes describing the script. In addition, a Data type Definition window allows a user to define the logic of determining the type of APV that needs to be created. A Data Type Definition window provides all the subrecords and fields to the user to define the logic. An Event Bypassing window allows the option of identifying data from an associated NE 18 that need to be bypassed from process stream. An event mapping window allows defining how the fields in the received data is mapped into APV format. Once a script has been selected and modified, the script is associated with a collection point (a particular NE 18) via an Mapping Script Association window 392, which lists existing associations for the purpose of selecting to associate or disassociate combinations of collection points and mapping scripts. Adding additional associations is done via an Associate NE Mapping Script window 394. Thereby, the FlexNE (Formatter) can process the usage when the data from this type of NE 18 is received.

The GUI 386 also allows interactively correlates and assembles call data records to flexibly output usage information for various billing-related activities. A Flexible Call Assembly Configuration window 396, depicted in FIG. 10, lists established collection points and associated call assembly configurations. From which, a Maintain Flexible Call Assembly Configuration Window 398 allows a user to add, edit and view assembly configurations, specifically by having an Attributes window 400 depicted in FIG. 11, a Source Record window 402 depicted in FIG. 12, a Related Record window 404 depicted in FIG. 13, a Matching Criteria window 406 depicted in FIG. 14, an Assembly windows 408 (which in turn comprises a volume-based window 410 depicted in FIG. 15, a time-based window 412 depicted in FIG. 16, and an expression-based window 414 depicted in FIG. 17), and an Assembly Specification window 416 depicted in FIG. 18. With collection points and assembly configurations established, an Assembly Associations window 418 lists already associated collection points and assembly configurations, depicted in FIG. 19. From which, a Maintain Assembly Associations window 420 allows selecting an assembly configuration to associate with a collection point, depicted as FIG. 20.

Known RPM supported the following types of call assemblies: (1) Voice Touch (Assembling Admin Records with multiple Connected Call Records); (2) Directory Assisted Call Completion (Assembling Admin Records with multiple Connected Call Records); (3) Lucent Data Services (Assembling PDP Records with MDP records); (4) GPRS (Assembling SGSN and GGSN records); (5) VoIP (Assembling Start and Stop records); (6) Ericsson Toll Ticket Assembly. As described above in the GUI depictions, aspects of the present invention include assembling CDR based on volume, expression and time. This description that follows explains in more detail time-based assembly criteria (i.e., when the assembly criteria is selected as time through the GUI), as well as more about audit and reconciliation counts, appending collected record details to the assembled record through assembly information subrecord.

The assembly criteria are checked only if there are at least one source and one or more related records that have come into the system. When the assembly criteria is selected as 'Time' through the GUI, the threshold time for that particular assembly id will be stored in the table 'NE_ASSLY_ATTRIBUTES'. The function CheckBasedonTime( ), which is a member function of Core Assembler, checks if the threshold time is reached before assembling the accumulated records. The complete set of records that reach the system well before the threshold time are assembled while processing the next dataset in the InitialAssembly.

In case of pre-assembly, the subrecords arriving to the assembler are be stored in a file with the name <dataFilename>.input which is newly created in a newly created directory called Preassembled in $CCD_DATA/nehd. The post-assembly subrecords are the APV assembled records that have an Assembly Header and it is then appended to the assembly information subrecord. This assembly information subrecord is appended for each source and related subrecords that have formed the assembly. Thus the first information within the first set of tags is the source subrecord information and the subsequent information is for the related subrecords.

For enhanced audit and reconciliation, several new counts are implemented and calculations performed. The _assembledSourceRecordCount count represents the total number of source records per dataset that went for assembly. The _assembledRelatedRecordCount count represents the total number of related records per dataset that went for assembly. The _assembledRecordCount count is of the output assembled records that are formed while processing the dataset. Note that collected records might be from the same file or different file. Any record which is neither a source nor a related record count is counted by the _nonAssemblyCandidateRecordCount count, thus _NonAssemblyCandidateRecordCount=outputCount−(assembledSourceRecordCount). The _matchCount count is the total number of records that got matched for a successful assembly. The _inputPoolCount count is the sum of the source and related records that are candidates for assembly in the pool while loading into the container. The _outputPoolCount count is the sum of the source and related records in the pool just before updating the table after flushing the container.

The equations for audits and reconciliation include $$inputPoolCount + Total\ Input\ Record = \_matchCount + \_outputPoolCount + \_NonAssemblyCandidateRecordCount + SystemBypassedcount - derived\ count$$

and $$Total\ Output\ Count = assembledRecountCount + NonAssemblyCandidateRecordCount$$

When the assembly is associated with the collection point, the collection point may also be made active or inactive through the GUI. When the user selects Inactive, the assembler process is bypassed. All of the records are processed in a normal way without assembly. When the user opts for Active, the assembler is enabled. The date range gives one more rule that is checked to determine whether the records are candidates for assembly. If no date range, then all of the records are considered for assembly.

The fields that are important for the GPRS assembly rules to be generated include several fields. The RecordSequenceNumber field contains a sequence number employed to link the partial records generated in SGSN/GGSN for a particular PDP context. This field is present only in case of partial and last partial record. This field is to be present if there is just one CDR for the PDP context. The presence of this field is used to check if the record is a candidate for assembly along with the rest of the rules specified below. The Cause For Record Closing field contains a reason for the release of the CDR, including the following (i) normal release; (ii) partial record (data volume limit, time limit, SGSN change, maximum number of changes in charging condition) and (iii) abnormal termination. This will be used of identifying source and related record identification. The Charging ID and GGSN Address fields together uniquely identify all of the call detail records produced for a certain PDP context. These two fields together are used as matching criteria. Duration Served PDP Address field is mandatory in the assembled record (i.e., in the specification) are duration and served PDP address. It will be appreciated that there are different types of assembly that are possible for GPRS. Only a single type of assembly will be associated with a particular collection point.

Operation of Mediation Manager

Figure 21:
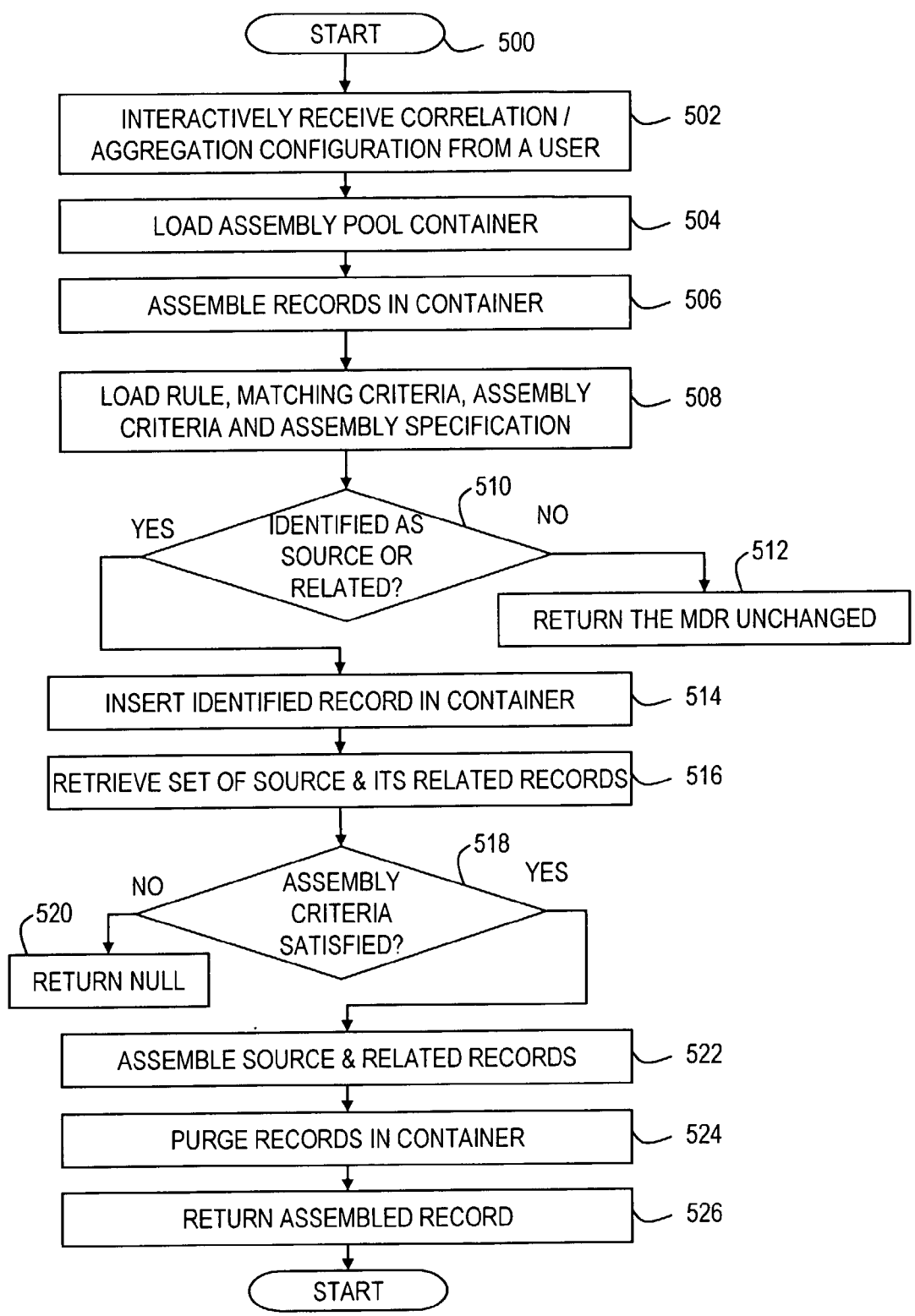
FIG. 21 is a flow diagram of a sequence of operations performed by the Flexible Network Interface of the mediation manager of FIG. 1.

In use, FIG. 21 depicts a sequence of operations for the mediation manager of FIG. 1 for assembling records in accordance to interactively configured settings from a user for correlation and aggregation. The procedure 500 begins by interactively receiving correlation/aggregation configuration information from a user (block 502). Then, an assembly pool container is loaded for storing the data (block 504) and the unassembled records are loaded into the assembly pool container (block 506). The unassembled records include source records that describe usage data from an originating source. The unassembled records also include related records that describe intermediate or destination usage data related to the same transmission or usage as the source record.

The rule that is associated with the stored data, the matching criteria, the assembly criteria, and the assembly specification are loaded (block 508). The matching criteria defines how one or more fields are evaluated against a logical expression to determine whether the record under test is a source or related record that are to be assembled together. The assembly criteria specify under what condition the matched records are to be assembled, such as when a certain volume or records have been matched (i.e., "volume-based"), a time threshold has been reached (i.e., "time-based"), or when a match is encountered in the records (i.e., "expression-based").

For each unassembled MDR, a determination is made as to whether this MDR is a source record or a related record in accordance with the matching criteria (block 510). If not a match, then the unassembled and unmatched MDR is returned to the container unchanged (block 512). If a match, then the identified record is so tracked in the container (block 514). Moreover, the method further contemplates tracking for auditing and reconciliation purposes the Matched Count, Pool Count, Unmatched Count, and To Be Assembled Count.

The matched source and related records are retrieved for purposes of determining whether assembly is warranted (block 516). Then, a determination is made as to whether the assembly criteria are satisfied (block 518). For example, the number of records (volume-based) may be the assembly criteria, or the elapsed or actual time (time-based), or the mere existence of the match (expression-based). If not satisfied, then the determination returns a null, and awaits being recalled at a future time to update the matching/assembly determination (block 520). Else, if the assembly criteria is satisfied, then the source and related records are assembled (block 522). This assembly may advantageously comprise assembling one source and one related record to one APV record in accordance with the assembly specification, or assembling one source record with one related record and to a plurality of APV records, or assembling one source record with a plurality of related records to a plurality of APV records. Related records are purged upon assembly and source records may be purged upon assembly or based upon another purge option such as a time threshold (block 524). Then the assembled records are returned for further distribution processing (block 526).

Dynamic Database Refreshment

Figure 22:
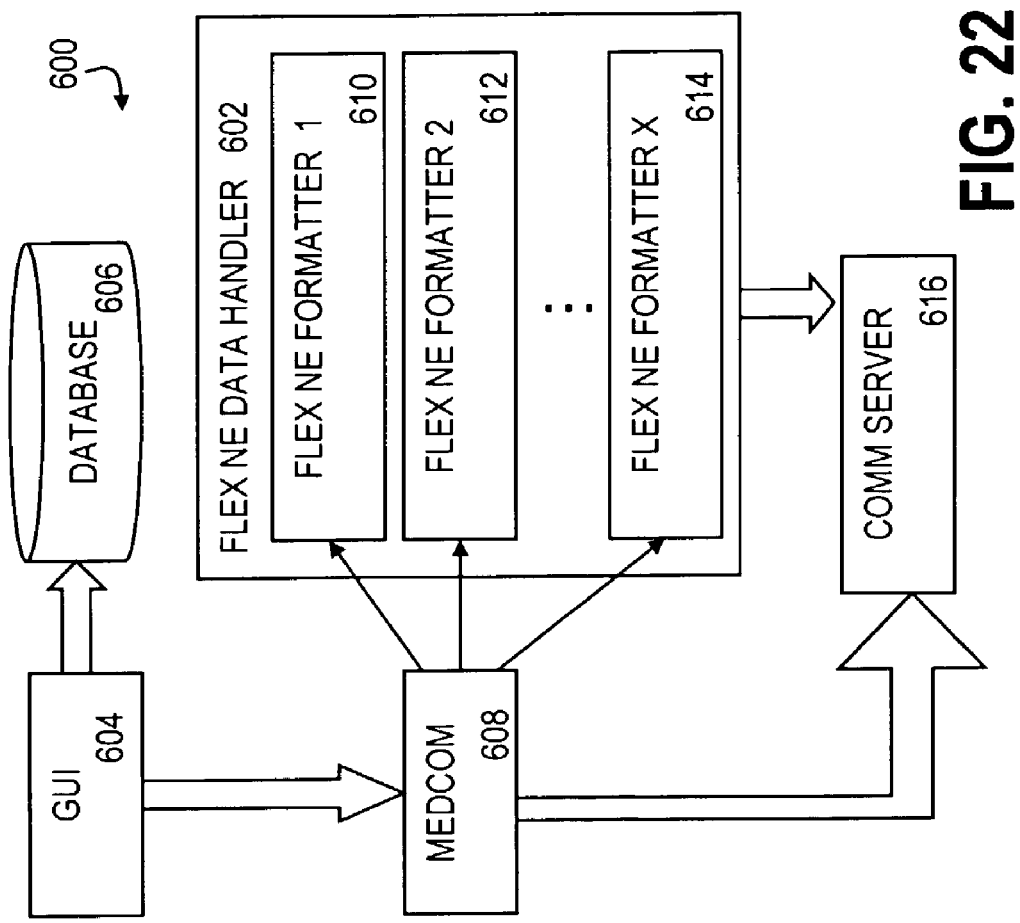
FIG. 22 is a database refreshment diagram performed by the Flexible Network Interface of FIG. 1.

With reference to FIG. 22, a Flex NE Interface 600 dynamically updates a Flex NE Handler 602 when a GUI 604 updates any Flex NE database 606. In particular, the GUI 604 informs a Medcom process 608 that resides on a routing center subsystem (not shown). The Medcom process 608 notifies Flex NE formatters (1, 2, . . . , n) 610-614, which are registered with the Medcom process 608, via a comm server 616. Thereafter, the Flex NE formatters 610-614 reload routines in order to implement the changes made by the GUI 604.

For instance, when a new collection point is created by the GUI 604, a corresponding entry is made in a mediate.dat file present in a $CCD_SRV_ROOT/bin database 606, thereby registering the Flex NE formatter 610 with the Medcom process 608. A static member boolean variable reloadFlag is added to the Mediation Manager to support dynamic database refreshment. The NE_application class 140 includes a private function ReloadTablesthat reloads all of the tables when reloadFlag is set true, by calling a private function LoadFeatures of the Parser component 168, then a private function LoadScripts of the CDR validator component 170, then a private function LoadScripts of the APVFormatter component 172, and then a private function LoadAssemblyDB of the Assembler component 174.

By virtue of the foregoing, a mediation manager 42 flexibly correlates and aggregates billing-related usage data from a plurality of collection points, matching a source record with one or more related records. Matched records are distributed in one or more assembled records to the billing-related system. A user may interactively define attributes, matching criteria, assembly criteria, purge options, assembly specifications to associate with a given collection point to rapidly and cost-effectively adapt a converged mediation network system to the ever-changing needs of the xSP customer.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. For example, although extensive illustrative examples of an OOP system have been depicted, it will be appreciated that applications may be written in many fashions.

LIST OF ABBREVIATIONS USED xSPs=Internet Protocol based Service Providers
ISP=Internet Service Providers
ASPs=Application Service Providers
TDMA=Time Division/Demand Multiple Access
CDMA=Code Division Multiple Access
GSM=Global System for Mobile Communication
GPRS=General Packet Radio Service
UMTS=Universal Mobile Telecommunications System
voIP=Voice-over-IP
RPM=Real-Time Processing Manager
NE=Network Elements
Flex NE=Flexible Network Element Interface
APV=ASCII Positional Variable
GUI=Graphical User Interface
Procom=Process Manipulator
Refcom=Distribution Reformatter
NEASL=Network Element APV Scripting Language
OOP=Object Oriented Programming
CDR=Call detail record
NE_ASSLY (Network Element Assembly)

What is claimed is:

1. A real-time computer-implemented method of distributing billing-related usage data records of one or more usage events received from a plurality of network collection points and processed through a converged mediation network system having at least one computer, the usage data records received raw from the plurality of network collection points in different formats and with varying types of informational content, and distributed as processed usage data records to one or more billing systems, the method comprising:
  a) converging all usage data records directly into a central data pool of the converged mediation network, wherein the central data pool provides a single point of entry into the converged mediation network and the usage data records are received directly from the plurality of network collection points as raw usage data records in different formats and with varying types of informational content detailing all of or part of one or more usage events, and received in any sequence;
  b) identifying usage data records converged within the single assembly pool for further processing by identifying one or more field values within each usage data record that match one of a predefined record type associated with one or more of the plurality of external network collection points, wherein the predefined record types are stored on computer readable media within the converged mediation network system and are used to identify incoming usage data records for further processing by identifying the incoming usage data records as comprising one or more of:

i) a source record, with one or more field values matching a predefined record type associated with one or more of the plurality of external network collection points, the source record comprising a usage data record received from an originating source, ii) a related record with one or more field values matching a predefined record type associated with one or more of the plurality of external network collection points, the related record comprising a usage data record related to a same transmission event or usage event as a source record, and received as one of an intermediate usage data record and a destination usage data record, and iii) a record unrelated to a predefined record type associated with one or more of the plurality of external network collection points;

c) matching identified usage data records in accordance with a matching criteria stored on computer readable media within the converged mediation network system, the matched usage data records comprising source records and related records of one of the predetermined record types matched for assembly together by evaluating one or more field values of each identified usage data record against a logical expression of the matching criteria to determine if the usage data records can be assembled;

d) assembling one or more matched usage data records of one of the predetermined record types in accordance with an assembly criteria stored on computer readable media within the converged mediation network system and specifying the conditions under which the matched usage data records are to be assembled, wherein when the assembly criteria are met, the one or more matched usage data records are assembled to create an assembled record of processed usage billing data correlated and aggregated for use by an appropriate billing system; and e) distributing assembled records of processed usage billing data to the appropriate billing systems for collection.

2. The method of claim 1, further comprising: interactively receiving one or more of an identifying rule, a matching criteria and an assembly criteria from a user to modify a predefined record type stored on a computer readable media within the converged mediation network system, to thereby modify subsequent processing of usage data records associated with the modified predefined record type.

3. The method of claim 1, wherein the step of assembling matched usage data records further comprises referencing a volume-based assembly criteria that specifies assembly of the matched usage data records when a certain volume of matched usage data records has been reached.

4. The method of claim 1, wherein the step of assembling matched usage data records further comprises referencing a time-based assembly criteria that specifies assembly of usage data records based on a time threshold.

5. The method of claim 1, wherein the step of assembling matched usage data records further comprises assembling the matched usage data records in accordance with an expression-based assembly criteria, and wherein the step of distributing the assembled records assembled in accordance with the expression-based assembly criteria further comprises distributing portions of the assembled records assembled in accordance with the expression-based assembly criteria to appropriate billing related systems.

6. The method of claim 1, further comprising: interactively associating, an identifying rule, a matching criteria and an assembly criteria with a network collection point to at least partially define a new predefined record type for the converged mediation network system.

7. The method of claim 1, wherein the step of assembling matched records further comprises assembling an one output record containing a matched source record and a matched related record.

8. The method of claim 1, wherein the step of assembling matched records further comprises assembling multiple output records, each assembly of multiple output records containing a matched source record and a matched related record.

9. The method of claim 1, wherein the step of assembling matched records further comprises assembling multiple output records, each assembled record comprising a selected pairing of a matched record and a plurality of matched related records.

10. The method of claim 1, wherein the step of assembling matched usage data records further includes placing the matched usage data records into an assembly pool container of the converged mediation network system and purging related records from the container, wherein the related records are purged after usage data from the related records is assembled into an assembled record of processed usage billing data.

11. The method of claim 10, further comprising purging source records from the assembly pool container after usage data from the source records is assembled into an assembled record of processed usage billing data.

\* \* \* \* \*